US012071789B2

(12) United States Patent
Bogdanov et al.

(10) Patent No.: US 12,071,789 B2
(45) Date of Patent: Aug. 27, 2024

(54) UNIVERSAL DOGGING AND ELECTRONIC LATCH RETRACTION

(71) Applicant: Sargent Manufacturing Company, New Haven, CT (US)

(72) Inventors: Victor Bogdanov, Manchester, CT (US); Liza Alcala Escobar, Avon, CT (US); Darren C. Eller, Madison, CT (US)

(73) Assignee: Sargent Manufacturing Company, New Haven, CT (US)

( * ) Notice: Subject to any disclaimer, the term of this patent is extended or adjusted under 35 U.S.C. 154(b) by 66 days.

(21) Appl. No.: 17/488,782

(22) Filed: Sep. 29, 2021

(65) Prior Publication Data

US 2022/0018162 A1 Jan. 20, 2022

Related U.S. Application Data

(63) Continuation of application No. 17/422,963, filed as application No. PCT/US2020/015339 on Jan. 28, 2020.

(60) Provisional application No. 62/797,712, filed on Jan. 28, 2019.

(51) Int. Cl.
*E05B 65/10* (2006.01)

(52) U.S. Cl.
CPC ...... *E05B 65/1093* (2013.01); *E05B 65/1053* (2013.01); *E05B 65/1073* (2013.01)

(58) Field of Classification Search
CPC ............. E05B 65/1093; E05B 65/1053; E05B 65/1073; E05B 65/10; E05B 65/1046; E05B 65/108; E05B 2047/0023; E05B 2047/0016; E05B 47/0012; E05B 47/023; Y10T 292/0908; Y10T 292/0909; Y10S 292/65
USPC ...................................................... 70/283, 92
See application file for complete search history.

(56) References Cited

U.S. PATENT DOCUMENTS 3,374,649 A * 3/1968 Weidman ............ E05B 65/1066 70/210
3,614,145 A * 10/1971 Zawadzki ........... E05B 65/1053 292/201
3,730,574 A * 5/1973 Zawadzki ........... E05B 65/1053 70/92

(Continued)

FOREIGN PATENT DOCUMENTS

CA 3210491 A1 * 8/2022 ......... E05B 65/1073
DE 102010001195 A1 * 7/2011 ......... E05B 47/0657

(Continued)

OTHER PUBLICATIONS

International Search Report and Written Opinion for International Application No. PCT/US2020/015339, mailed Apr. 22, 2020.

(Continued)

*Primary Examiner* — Kristina R Fulton
*Assistant Examiner* — Steven A Tullia
(74) *Attorney, Agent, or Firm* — Wolf, Greenfield & Sacks, P.C.

(57) ABSTRACT

A dogging mechanism for an exit device may include a progressive latching arrangement to allow for dogging at a plurality of positions of a push bar. An electronic latch retraction device may include a camming arrangement configured to provide mechanical advantage when retracting a push bar of an exit device.

19 Claims, 18 Drawing Sheets

(56) References Cited

U.S. PATENT DOCUMENTS

| | | | | | | |
|---|---|---|---|---|---|---|
| 3,767,238 | A | * | 10/1973 | Zawadzki | E05B 65/1053 | 292/201 |
| 3,854,763 | A | * | 12/1974 | Zawadzki | E05B 47/0002 | 292/201 |
| 3,873,141 | A | * | 3/1975 | Peterson | E05B 65/1066 | 292/210 |
| 3,945,670 | A | * | 3/1976 | Peterson | E05B 65/1066 | 292/144 |
| 4,083,590 | A | * | 4/1978 | Folger | E05B 65/1053 | 292/168 |
| 4,466,643 | A | * | 8/1984 | Godec | E05B 63/0065 | 292/210 |
| 4,624,490 | A | * | 11/1986 | Miller | E05B 65/1073 | 70/92 |
| 4,801,163 | A | * | 1/1989 | Miller | E05B 65/1073 | 292/201 |
| 4,875,722 | A | * | 10/1989 | Miller | E05B 65/1073 | 292/201 |
| 4,968,070 | A | | 11/1990 | Choi | | |
| 5,011,199 | A | * | 4/1991 | Lowe | E05B 47/0002 | 292/DIG. 65 |
| 5,016,927 | A | * | 5/1991 | Toledo | E05B 65/1053 | 292/210 |
| 5,340,171 | A | * | 8/1994 | Slaybuagh | E05B 47/023 | 292/201 |
| 5,372,394 | A | * | 12/1994 | Salter | E05B 51/02 | 292/144 |
| 5,525,880 | A | * | 6/1996 | Geringer | E05F 15/79 | 318/446 |
| 5,531,492 | A | | 7/1996 | Raskevicius | | |
| 5,927,765 | A | * | 7/1999 | Austin | E05B 63/0065 | 292/229 |
| 5,969,440 | A | * | 10/1999 | Young | E05B 65/108 | 70/432 |
| 6,104,594 | A | * | 8/2000 | Frolov | E05B 65/1073 | 361/139 |
| 6,116,661 | A | * | 9/2000 | Overbey | E05B 65/1053 | 292/DIG. 60 |
| 6,189,939 | B1 | * | 2/2001 | Zehrung | E05B 65/1053 | 70/92 |
| 6,394,508 | B1 | * | 5/2002 | Zehrung | E05B 65/1053 | 70/92 |
| 6,532,777 | B2 | | 3/2003 | Haeck et al. | | |
| 6,565,130 | B1 | * | 5/2003 | Walsh, III | E05B 47/0002 | 292/201 |
| 6,820,905 | B1 | * | 11/2004 | Haeck | E05B 65/1013 | 70/92 |
| 7,173,389 | B1 | * | 2/2007 | Gagnon | H02H 7/0851 | 318/434 |
| 7,484,777 | B2 | * | 2/2009 | Condo | E05B 65/1053 | 70/92 |
| 7,883,123 | B2 | | 2/2011 | Condo et al. | | |
| 7,905,522 | B1 | * | 3/2011 | Picard | E05B 65/1073 | 292/93 |
| 8,978,305 | B2 | * | 3/2015 | Morstatt | E05B 65/1093 | 292/201 |
| 10,107,015 | B2 | | 10/2018 | Geringer et al. | | |
| 10,370,872 | B2 | * | 8/2019 | Pfunder | E05B 65/108 | |
| 11,332,961 | B2 | * | 5/2022 | Arlinghaus | E05B 47/0012 | |
| 11,365,563 | B2 | | 6/2022 | Ginter et al. | | |
| 2001/0005996 | A1 | | 7/2001 | Haeck et al. | | |
| 2004/0189018 | A1 | * | 9/2004 | Geringer | E05B 65/1046 | 292/251.5 |
| 2005/0012343 | A1 | * | 1/2005 | Warden | E05B 65/1053 | 292/144 |
| 2006/0082162 | A1 | * | 4/2006 | Escobar | E05B 65/1053 | 292/201 |
| 2006/0192393 | A1 | | 8/2006 | Johansson et al. | | |
| 2008/0012350 | A1 | * | 1/2008 | Condo | E05B 65/1093 | 292/92 |
| 2009/0174194 | A1 | * | 7/2009 | Tien | E05B 65/1053 | 292/92 |
| 2010/0123323 | A1 | * | 5/2010 | Geringer | E05B 47/0012 | 292/164 |
| 2011/0047874 | A1 | * | 3/2011 | Lowder | E05B 65/1053 | 49/31 |
| 2013/0154283 | A1 | | 6/2013 | Arlinghaus et al. | | |
| 2014/0001776 | A1 | * | 1/2014 | Tanpure | E05B 83/42 | 292/336.3 |
| 2014/0109479 | A1 | * | 4/2014 | Morstatt | E05B 65/1093 | 292/144 |
| 2015/0184426 | A1 | | 7/2015 | Arlinghaus et al. | | |
| 2016/0230423 | A1 | | 8/2016 | Lehner, Jr. et al. | | |
| 2016/0319570 | A1 | | 11/2016 | Wong et al. | | |
| 2016/0333621 | A1 | * | 11/2016 | Lehner, Jr. | E05F 11/54 | |
| 2017/0102058 | A1 | * | 4/2017 | Stephenson | E05B 47/0012 | |
| 2017/0292294 | A1 | * | 10/2017 | Brennan | E05B 63/18 | |
| 2018/0258667 | A1 | * | 9/2018 | Lehner, Jr. | E05F 11/54 | |
| 2020/0199922 | A1 | | 6/2020 | Cote et al. | | |
| 2021/0189768 | A1 | | 6/2021 | Jung et al. | | |
| 2022/0145668 | A1 | | 5/2022 | Bogdanov et al. | | |

FOREIGN PATENT DOCUMENTS

| | | | | | |
|---|---|---|---|---|---|
| DE | 102014113581 | A1 | * | 2/2016 | E05B 81/06 |
| DE | 102017100731 | A1 | * | 7/2018 | E05B 65/1053 |
| DE | 10 2019 111 871 | A1 | | 11/2020 | |
| DE | 102019111870 | A1 | * | 11/2020 | E05B 47/0012 |
| EP | 0481931 | A1 | * | 10/1991 | E05B 65/1053 |
| EP | 1031688 | A1 | * | 8/2000 | E05B 17/22 |
| EP | 1031689 | A1 | * | 8/2000 | E05B 65/1053 |
| EP | 2439363 | A2 | * | 4/2012 | E05B 17/0041 |
| EP | 3 736 400 | A1 | | 11/2020 | |
| FR | 2668790 | A1 | * | 5/1992 | E05B 17/2011 |
| FR | 2685378 | A1 | * | 6/1993 | E05B 65/1053 |
| FR | 2695675 | A1 | * | 3/1994 | E05B 47/0002 |
| FR | 2720779 | A3 | * | 12/1995 | E05B 17/007 |
| GB | 2550281 | A | * | 11/2017 | E05B 47/0001 |
| KR | 20090036088 | A | * | 6/2007 | E05B 65/1093 |
| WO | WO-2012155177 | A1 | * | 11/2012 | E05B 47/0012 |
| WO | WO-2014063043 | A1 | * | 4/2014 | E05B 47/026 |
| WO | WO-2019076397 | A1 | * | 4/2019 | E05B 63/006 |

OTHER PUBLICATIONS

International Preliminary Report on Patentability for International Application No. PCT/US2020/015339, mailed Aug. 12, 2021.

U.S. Appl. No. 17/422,963, filed Jul. 14, 2021, Bogdanov et al.

PCT/US2020/015339, Apr. 22, 2020, International Search Report and Written Opinion.

PCT/US2020/015339, Aug. 12, 2021, International Preliminary Report on Patentability.

Bogdanov et al., Universal dogging and electronic latch retraction. Co-Pending U.S. Appl. No. 17/422,963, filed Jul. 14, 2021.

Lorello et al., Universal electronic latch retraction mechanism. Co-Pending U.S. Appl. No. 18/275,768, filed Aug. 3, 2023.

* cited by examiner

UNIVERSAL DOGGING AND ELECTRONIC LATCH RETRACTION

CROSS-REFERENCE TO RELATED APPLICATIONS

This Application is a Continuation of U.S. application Ser. No. 17/422,963, filed Jul. 14, 2021, entitled "UNIVERSAL DOGGING AND ELECTRONIC LATCH RETRACTION", which is a national stage filing under 35 U.S.C. 371 of International Patent Application Serial No. PCT/US2020/015339, filed Jan. 28, 2020, entitled "UNIVERSAL DOGGING AND ELECTRONIC LATCH RETRACTION", which claims benefit of U.S. Application Ser. No. 62/797,712, filed Jan. 28, 2019, entitled "UNIVERSAL DOGGING AND ELECTRONIC LATCH RETRACTION each of which is incorporated by reference herein in its entirety.

FIELD

Disclosed embodiments are related to universal dogging, electronic latch retraction, and related methods of use.

BACKGROUND

Conventional exit devices typically employ a dogging mechanism which may be used to prevent a latch from engaging an associated door strike. These dogging mechanisms are typically used in commercial situations where it is desirable to keep doors open for both push and pull without actuation of the latch. Conventional dogging mechanisms are specific to a particular latching arrangement or exit device.

Electronic control of exit devices is typically employed in large commercial buildings with space for a central controller. This central controller may be controlled to selectively latch or unlatch doors using an actuator disposed in the exit device.

SUMMARY

In some embodiments, a dogging mechanism for an exit device, the exit device having a push bar configured to move between an extended position and a retracted position, includes a progressive blocking element including a plurality of locking regions and a catch configured to engage at least one of the plurality of locking regions. When the catch is engaged with at least one of the plurality of locking regions, the progressive blocking element blocks motion of the push bar from the retracted position toward the extended position. When the catch is disengaged with the plurality of locking regions, the progressive blocking element is configured to allow motion of the push bar from the retracted position toward the extended position.

In some embodiments, a dogging mechanism for an exit device, the exit device having a push bar configured to move between an extended position and a retracted position, includes a blocking element configured to move between a first blocking position and a second unblocking position, where the blocking element is configured to block motion of the push bar from the retracted position toward the extended position when the blocking element is in the second position. The blocking element is configured to allow motion of the push bar from the retracted position toward the extended position. The dogging mechanism also includes a ratchet and pawl configured to prevent movement of the blocking element towards the second unblocking position, where the ratchet includes a plurality of locking regions configured to prevent movement of the blocking element in a plurality of locking positions, and an actuator configured to move the blocking element from the first blocking position and the second unblocking position.

In some embodiments, an electronic latch retraction device for an exit device, the exit device having a push bar configured to move between an extended position and a retracted position, includes an electromechanical actuator, a force input portion configured to receive force from the electromechanical actuator, and a force output portion configured to transmit the force received by the force input portion to the push bar to move the push bar to the retracted position. The force transmitted to the push bar to the move the push bar to the retracted position is between 1.2 and 2 times greater than the force received by the force input portion.

In some embodiments, an electronic latch retraction device for an exit device, the exit device having a push bar configured to move between an extended position and a retracted position, includes an electromechanical actuator, a first linkage coupled to the electromechanical actuator, where the first linkage is configured to move in a linear direction between a first linear position and a second linear position, a cam wheel coupled to the first linkage, where the cam wheel is configured to rotate between a first rotational position and a second rotational position when the first linkage moves between the first position and the second linear position, and a second linkage coupled to the cam wheel and configured to be coupled to a lever. The second linkage is configured to actuate the lever when the cam wheel rotates from the first rotational position to the second rotational position.

In some embodiments, an exit device includes a push bar including a lever, where the lever is configured to move the push bar between an extended position and a retracted position. The exit device also includes a latch retraction device having a first actuator, a first linkage coupled to the first actuator, where the first linkage is configured to move in a linear direction between a first linear position and a second linear position, a cam wheel coupled to the first linkage, where the cam wheel is configured to rotate between a first rotational position and a second rotational position when the first linkage moves between the first position and the second linear position, and a second linkage coupled to the cam wheel and configured to be coupled to the lever, where the second linkage is configured to actuate the lever when the cam wheel rotates from the first rotational position to the second rotational position. The exit device also includes a dogging mechanism having a blocking element configured to move between a first blocking position and a second unblocking position, where the blocking element is configured to block motion of the push bar from the retracted position toward the extended position when the blocking element is in the second position. The blocking element is configured to allow motion of the push bar from the retracted position toward the extended position. The dogging mechanism also includes a ratchet and pawl configured to prevent movement of the blocking element towards the second unblocking position, where the ratchet includes a plurality of locking regions, and a second actuator configured to move the blocking element from the first blocking position and the second unblocking position.

In some embodiments, a method for operating an exit device includes engaging a ratchet and a pawl, blocking motion of a push bar from a retracted position toward an extended position using the ratchet and the pawl, disengaging the ratchet and the pawl, and allowing motion of the push bar from the retracted position toward the extended position.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
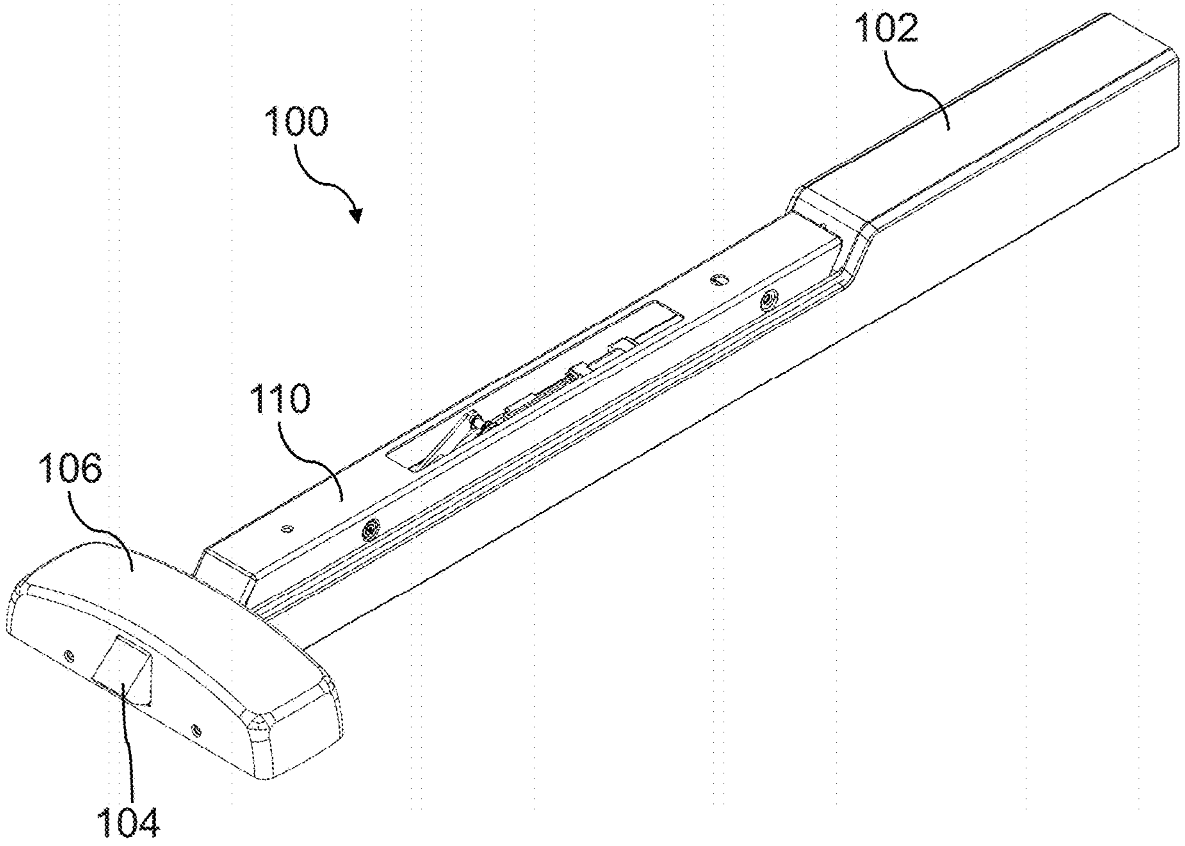
FIG. 1 is a perspective view of one embodiment of an exit device.

Conventional dogging mechanisms are generally limited to particular latching arrangements. That is, a dogging mechanism, which holds a push bar of an exit device in a retracted position against the biasing force, precisely catches the push bar in a particular arrangement where the latch is disengaged. However, many exit devices and latch types have variations in the position of the push bar when the latch is fully retracted. Moreover, mechanical play (i.e., lash) and wear may alter this dogged position of the push bar over time with use of the exit device. Accordingly, conventional dogging mechanisms are designed and built for specific latching hardware. Additionally, traditional dogging mechanisms are manual devices which lack the ability to be moved between dogged and undogged states remotely. Design considerations for remotely actuated dogging mechanisms are currently different for each exit device and are therefore prohibitively expensive. Thus, there is considerable expense and complexity in providing reliable dogging mechanisms across a range of similar exit devices.

In view of the above, the inventors have recognized the benefits of a universal dogging mechanism which allows for variation in the travel of the push bar without compromising the security of the push bar in the dogged state. Such an arrangement allows a single dogging mechanism to be employed across a range of exit devices with a variety of latch arrangements having different travel characteristics. Additionally, the inventors have recognized the benefits of a dogging mechanism with multiple methods of undogging so that the dogging mechanism may be operated manually or remotely (e.g., with a powered actuator). The inventors have also recognized the benefits of a dogging mechanism which is easily releasable, such that the dogging mechanism may be released by a low power actuator, such as a battery powered actuator.

Conventional electronic latch retractors typically are employed in large commercial building where doors may be wired for power and a central controller may be used to control the functionality of many exit devices. These conventional electronic latch retractors typically employ a solenoid which disengages the latch under power and retains the latch in the disengaged position until an operator releases the exit device. Thus, conventional electronic latch retractors operate as dogging mechanism replacements, where an electronically controlled actuator is actively used to retain the latch in the disengaged position instead of employing a mechanical element. However, these electronic latch retractors require significant amounts of constant power which limit them to wired installations. Additionally, the latch retractors are relatively inefficient and do no employ mechanical advantage to reduce the power consumption of the actuator.

In view of the above, the inventors have recognized the benefits of an electronic latch retraction device which employs mechanical advantage to reduce the power usage of an actuator retracing the latch. Such an arrangement may be well suited to retrofit applications where power is limited (e.g., battery powered) or where energy conservation in general is desirable. Additionally, the inventors have recognized the benefits of employing an electronic latch retraction device with a universal dogging mechanism so that an exit device may be held mechanically in a dogged state. Such an arrangement may be beneficial to reduce power consumption of the exit device and ensure dogging across a variety of exit devices with different latch arrangements.

In some embodiments, the dogging mechanism may be a linear dogging mechanism whereas in other embodiments, the dogging mechanism may be a rotary dogging mechanism. In the linear dogging mechanism embodiments, the linear dogging mechanism includes a sliding cam plate, a cam wheel, and a ratchet and pawl. The sliding plate may include one or more cam slots which cooperate with the cam wheel to move the pawl (i.e., a catch) into and out of engagement with the ratchet (i.e., a progressive blocking element). That is, when the linear dogging mechanism is engaged to dog an exit device, the cam wheel may be rotated by the sliding cam plate to bring the pawl into engagement with one or more ratchet teeth of the ratchet. As the ratchet may include a plurality of teeth, the pawl may catch a suitable position corresponding to the retracted position of a push bar of the exit device where the exit device is kept in the dogged state. To release the exit device from the dogged state, the sliding cam plate may be moved in an opposite direction to move the pawl out of engagement with the ratchet teeth so that the push bar may return to an extended position corresponding to an undogged state. The sliding cam plate may be actuated manually (e.g., with a pin in a cam slot) or may be actuated with a powered actuator (e.g., a linear actuator) to selectively dog or undog the exit device. In some embodiments, the engaged ratchet and pawl may allow the push bar to be moved towards the retracted state so that the dogging mechanism can be set to a dog-on-next-exit state. In this state, the push bar may be depressed to dog the door without further intervention by an operator.

In the rotary dogging mechanism embodiments, the rotary dogging mechanism may include a rotational cam block and an arcuate ratchet and pawl. According to this embodiment, the rotational cam block may be selectively rotated to dog an exit device. The rotational cam block is held in place by the arcuate ratchet and pawl. The pawl may be hinged so that the pawl may be moved out of engagement with the ratchet through the application of a force to the ratchet pawl. Accordingly, manual force or force from an actuator may be used to move the pawl out of engagement with the ratchet to allow the rotational cam block to release movement of a push bar of an exit device. Such an arrangement may reduce friction and/or provide smooth dogging and undogging. The ratchet and pawl may allow the push bar to be moved toward the retracted position such that the rotary dogging mechanism is in a dog-on-next-exit state.

In some embodiments, powered actuators may be employed to control a dogging mechanism. For example, a powered linear actuator may be used in either the linear dogging mechanism or the rotary dogging mechanism to dog or undog an exit device. In some embodiments, the linear actuator may cooperate with a manual interface (e.g., a hex key) without interference so that automatic, remote, or manual methods of dogging or undogging may be employed. In some embodiments, a powered actuator may place the dogging mechanism into a dog-on-next-exit state without actually dogging the door. Such an arrangement may be appropriate for low power or energy efficient applications. Of course, any suitable powered actuators may be employed to actuate any desirable portion of the exit device, as the present disclosure is not so limited.

In some embodiments, an electronic latch retraction device may be employed. In some embodiments, the electronic latch retraction device includes, an electromechanical linear actuator, a retraction cam wheel, a first linkage, and a second linkage. The cam wheel may be disposed between the first linkage and second linkage and pinned so that the retraction cam wheel cams the second linkage when a force is applied to the first linkage. The camming action of the retraction cam wheel may create a mechanical advantage on the second linkage, such that an associated lever coupled to a push bar may be actuated with a low force applied to the first linkage. The linear actuator may apply a pushing force to retract the door, which may also contribute to increased mechanical advantage. In some embodiments, the force applied to the bar may be at least 1.5 times greater than a conventional pulling arrangement. Such an arrangement may allow for lower power usage and wear on a linear actuator of an electronic latch retraction device.

In some embodiments, an electronic latch retraction device may include an encoder configured to measure the position of the bar. The encoder may be a rotary or linear encoder coupled to any suitable component of the electronic latch retraction device. In some embodiments, the encoder may be configured as a Hall Effect sensor and a magnet may be disposed to move linearly in coordination with the linear actuator. The magnet may be configured to ride in a channel formed or otherwise associated with a chassis of the electronic latch retraction device so that consistent motion of the magnet is ensured. Such an arrangement may improve reliability and accuracy of a measured push bar position, which may be used to control various components such as the linear actuator, a powered dogging actuator, or other associated devices or systems.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 is a perspective view of one embodiment of an exit device 100. As shown in FIG. 1, the exit device includes a rail 102, a latch 104, a chassis cover 104, and a push bar 110. The push bar is configured to move between an extended position and a retracted position to correspondingly engage or disengage the latch to secure an associated door.

Figure 2:
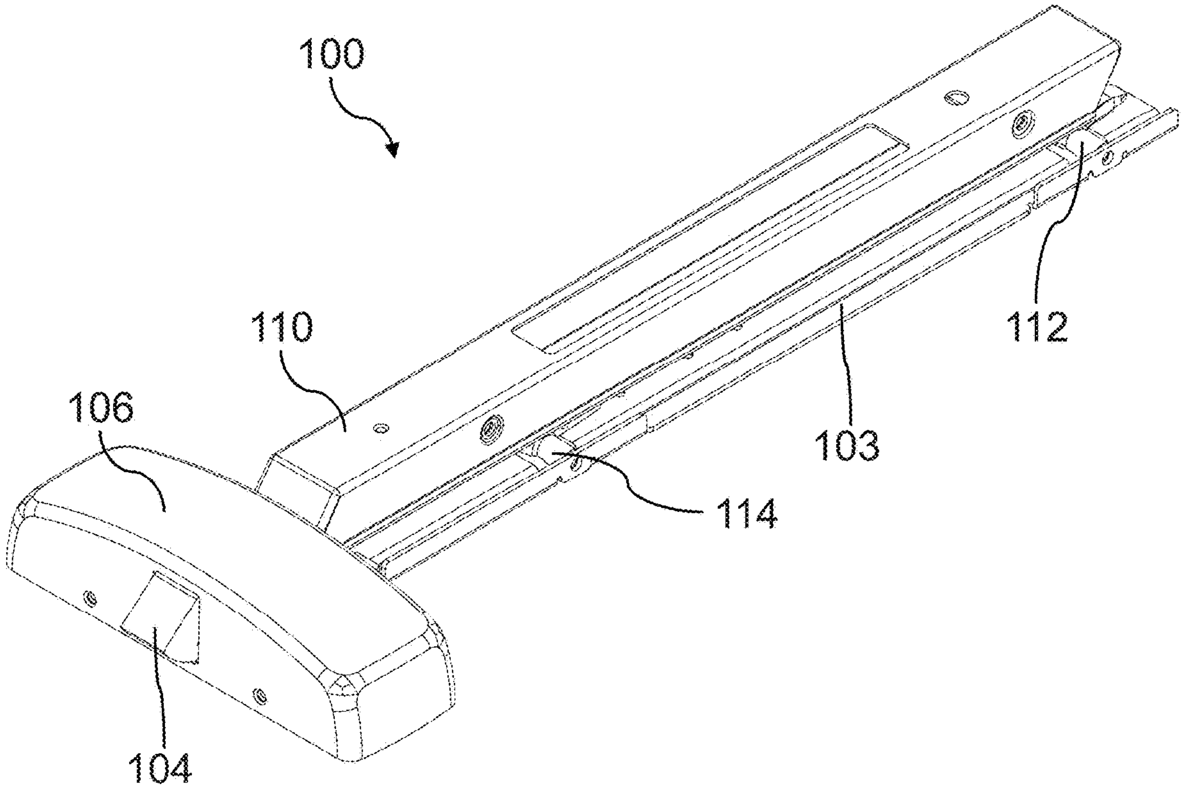
FIG. 2 is a perspective view of the exit device of FIG. 1 with a rail partially removed.

FIG. 2 is a perspective view of the exit device 100 of FIG. 1 with a rail partially removed. As shown in FIG. 2, the push bar 110 is suspended from a rail base 103 with multiple levers. That is, a first lever 112 and a second lever 114 are rotatably mounted to both the push rail 110 and the rail base 103. Accordingly, the push bar may be moved between the retracted and extended positions along the arc of the rotating levers. Of course, in other embodiments the push bar may move substantially linearly or may use any other suitable direction of travel, as the present disclosure is not so limited. As used herein, the retracted position is a position closest to the rail base and the extended position is a position furthest from the rail base. The retracted position and extended positions may be set such that the latch is appropriately engaged or disengaged when the push bar is moved between the extended and retracted positions, respectively.

Figure 3:
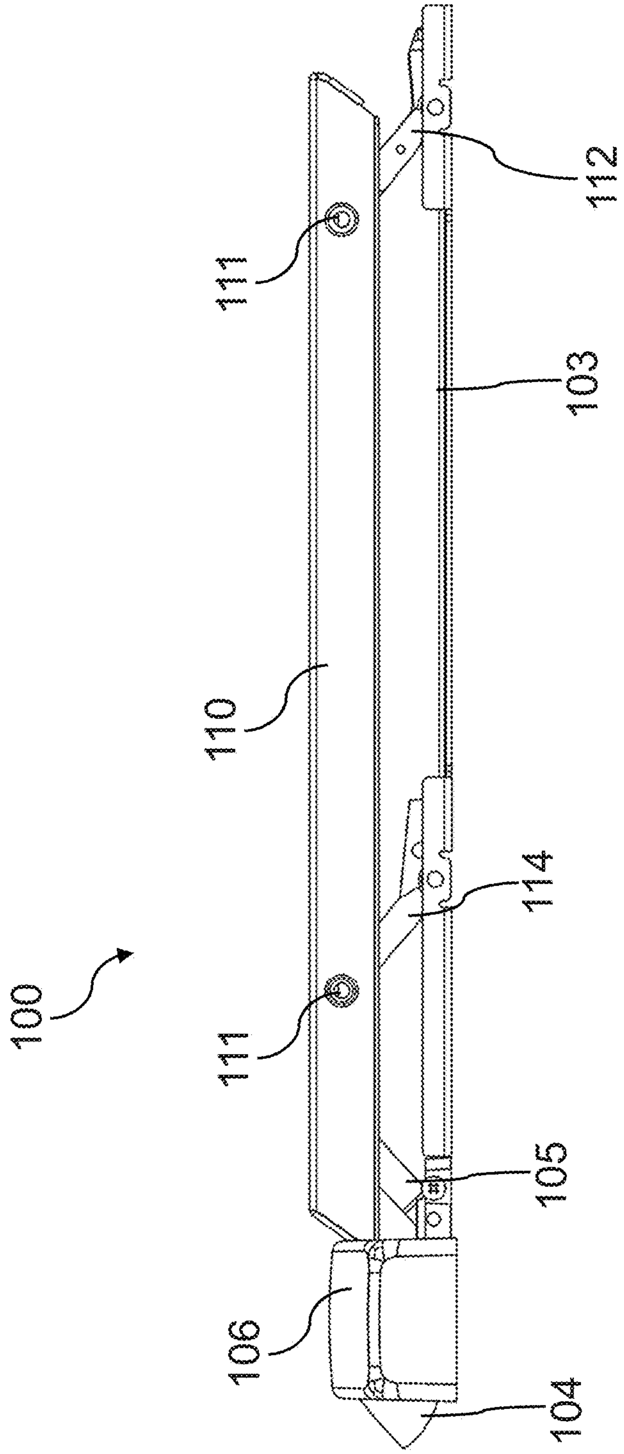
FIG. 3 is a first side elevation view of the exit device of FIG. 1 with a rail partially removed.

FIG. 3 depicts a first side elevation view of the exit device 100 of FIG. 2. As shown in FIG. 3, the exit device includes a latch lever 105 which is used to transmit the motion of the push bar between the retracted and extended positions and the motion of the latch between the engaged and disengaged positions. The latch lever may abut the push bar so that the latch lever is cammed when the push bar is moved toward the retracted position. The first lever 112 and second lever 114 are coupled to the push bar at hinge portions 111 which allow the levers to rotate relative to the push bar when the push bar is moved. One or more of the levers may include a biasing member which biases the push bar toward the extended position. In some embodiments, each of the first lever, second lever, and latch lever include a biasing member (e.g., spring) urging the push bar toward the extended position.

Figure 4:
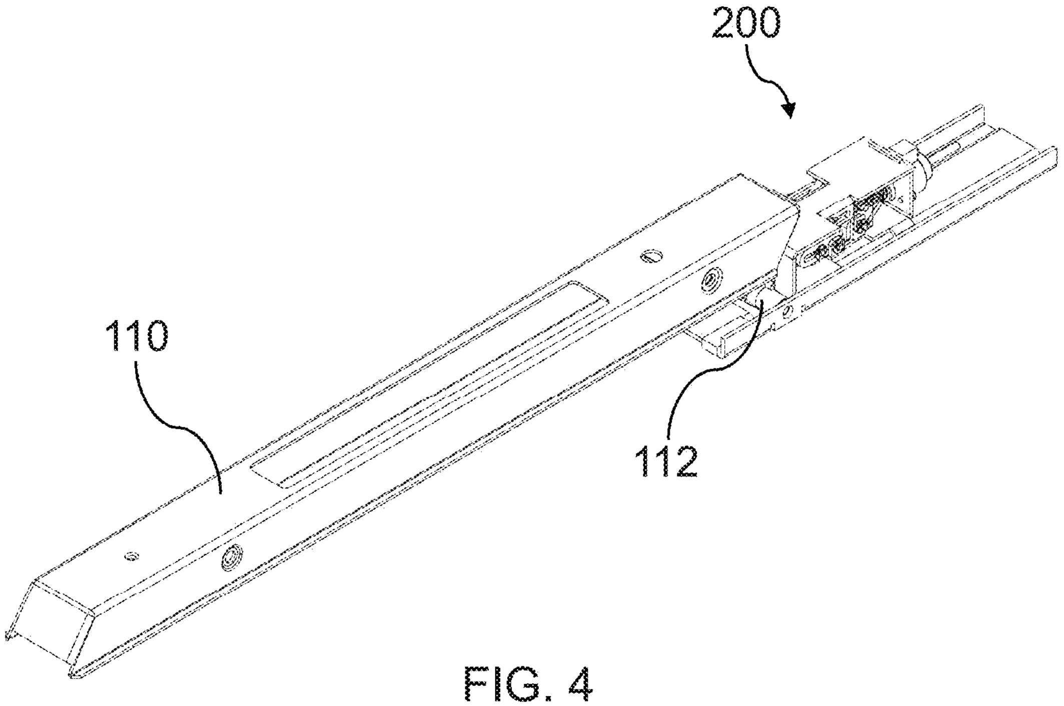
FIG. 4 is a perspective view of one embodiment of a push bar and dogging mechanism.

FIG. 4 is a perspective view of one embodiment of a push bar 110 and dogging mechanism 200. According to the embodiment shown in FIG. 4, the dogging mechanism is configured to selectively retain the push bar in the retracted position. That is, the dogging mechanism is configured to block motion of the push bar from the retracted position toward the extended position. Accordingly, the dogging mechanism maintains an associated latch in the disengaged state. As shown in FIG. 4, the dogging mechanism is coupled to the first lever 112 and is configured to control the motion of the push bar through the first lever. However, any suitable lever may be employed, and the dogging mechanism may be coupled to a second lever (for example, see second lever 114 in FIGS. 2-3) or any other dogging lever or coupling configured to control motion of the push bar.

Figure 5:
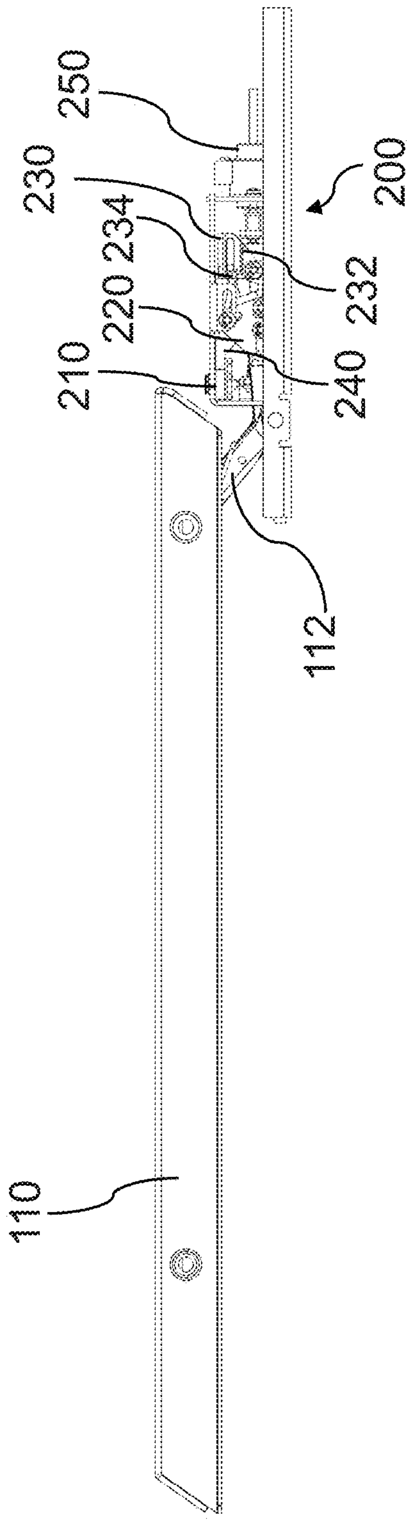
FIG. 5 is a first side elevation view of the push bar and dogging mechanism of FIG. 4.

FIG. 5 is an elevation view of a first side of the push bar 110 and dogging mechanism 200 of FIG. 4, better showing the mechanical components of the dogging mechanism. According to the embodiment shown in FIG. 5, the dogging mechanism includes a manual actuator 210, a cam wheel 220, a ratchet cam 230, a sliding cam plate 240, and an optional linear actuator 250 which cooperate to control a dogging state of the dogging mechanism. That is, the manual actuator and/or linear actuator 250 may be used to engage a ratchet 232 and a pawl 234 to selectively block the motion of the push bar 110, as will be discussed further below.

Figure 6:
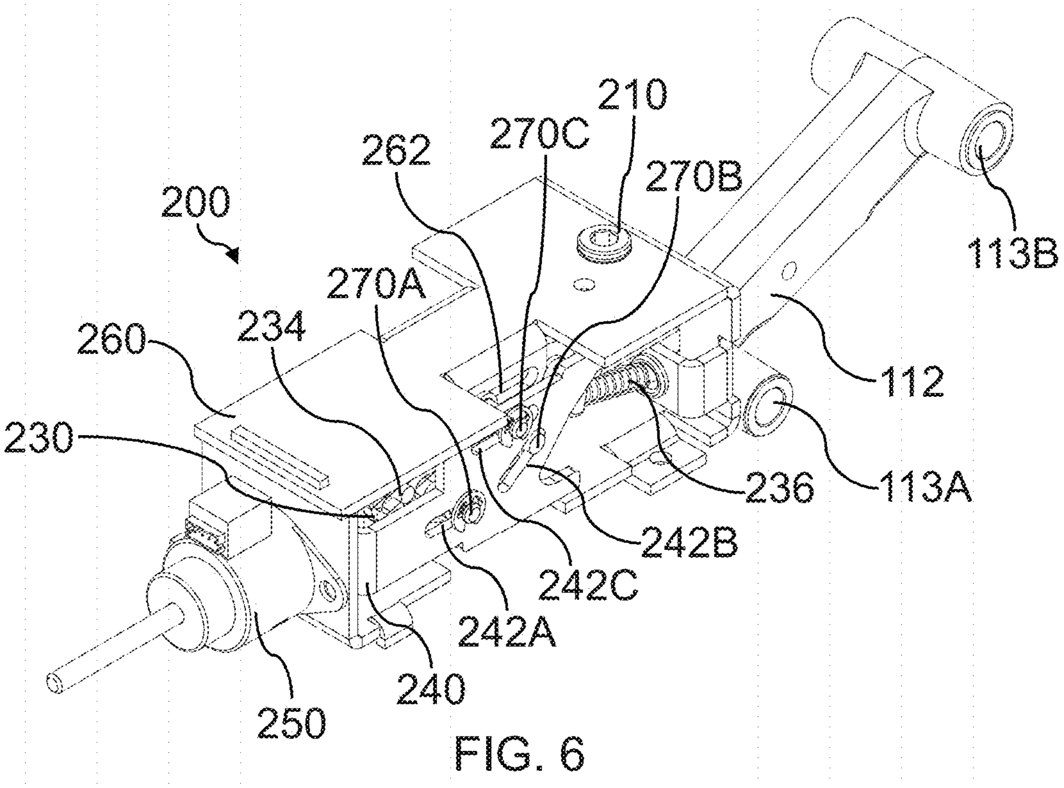
FIG. 6 is a perspective view of the dogging mechanism of FIG. 4.

FIG. 6 is a perspective second side view of the dogging mechanism 200 of FIG. 4 showing the mechanical components in greater detail. As discussed previously, the dogging mechanism includes a manual actuator 210, a ratchet cam 230, a sliding cam plate 240, and a linear actuator 250. Obscured from the view shown in FIG. 6 is the cam wheel, which is disposed behind the sliding cam plate 240. Also shown in FIG. 6 are a housing 260, the first lever (i.e., dogging lever) 112 having a first hinge portion 113A and a second hinge portion 113B, and a plurality of pins 270A, 270B, 270C. According to the embodiment shown in FIG. 6, the dogging mechanism is configured with three moving components which are intercoupled with the plurality of pins: the ratchet cam 230, the cam wheel (see FIG. 7), and the sliding cam plate 240. The cam wheel is coupled directly to the first lever 112, and ultimately controls the motion of the first lever to dog (i.e., engage) or undog (i.e., disengage) the dogging mechanism. The sliding plate cam 240 is coupled to the cam wheel via third pin 270C which is disposed in a third plate slot 242C formed in the sliding cam plate. The sliding plate cam and the ratchet cam 230 are coupled via first pin 270A disposed in first plate slot 242A and the second pin 270B disposed in the second plate slot 242B. According to the embodiment shown in FIG. 6, the position of sliding cam plate controls the state of the dogging mechanism between the dogged and undogged states. That is, the movement of the sliding cam plate between a first blocking position and a second unblocking position controls whether the dogging mechanism is dogged or undogged. The couplings and cam slots shown in FIG. 6, as well as others described further below, allow for this reliable dogging and undogging as will be discussed further with reference to FIGS. 7-10.

Figure 7:
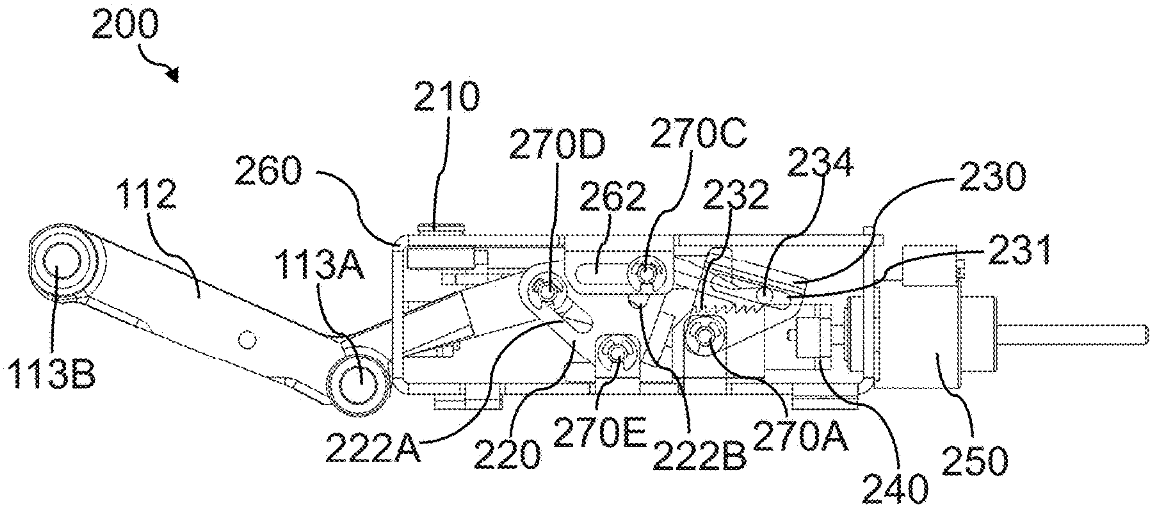
FIG. 7 is a first side elevation view of the dogging mechanism of FIG. 6 in a dogged state.

FIG. 7 is an elevation view of the first side of the dogging mechanism 200 of FIG. 6 in a dogged state. As discussed previously, the dogging mechanism of the embodiments shown in FIG. 7 includes a cam wheel 220, a ratchet cam 230, and a sliding cam plate 240 all disposed within a housing 260. A manual actuator 210 or a linear actuator 250 may be used to manipulate the position of the sliding cam plate 240. That is, the manual actuator may cam the sliding cam plate between a first blocking position (for example, see FIG. 8) and a second unblocking position (for example, see FIG. 10). Alternatively, the linear actuator may apply a linear force to the sliding cam plate to move it between the first blocking position and the second unblocking position. As noted previously, the sliding cam plate functions as a blocking element, and moves each of the other major components to different positions when moved.

As shown in FIG. 7, the cam wheel 220 includes three pinned portions corresponding to third pin 270C, fourth pin 270D, and fifth pin 270E. The third pin 270C is disposed in a housing slot 262 formed in the housing which constrains the third pin to movements in a linear direction. The third pin is also disposed in a second cam wheel slot 222B which allows the cam wheel to rotate while constraining the third pin to the housing slot. Additionally, the third pin couples the cam wheel to the sliding cam plate which includes a slot which corresponds to housing slot 262. The fourth pin 270D is disposed in first cam wheel slot 222A and couples the lever 112 to the cam wheel. The fifth pin 270E rotatably couples the cam wheel to the housing and functions as a rotational axis of the cam wheel. That is, the rotational axis of the cam wheel is substantially transverse to the direction of movement of the push bar between the extended and retracted positions. In the state shown in FIG. 7, the cam wheel is fully rotated in a clockwise direction relative to the page. When the cam wheel is rotated clockwise, the lever 112 is correspondingly rotated in a counter-clockwise direction relative to the page about first hinge portion 113A which also moves an associated push bar to the retracted position. That is, second hinge portion 113B is moved in a downward direction relative to the page when a push bar is depressed. Thus, when a push bar is depressed, the lever will rotate the cam wheel 220 in a clockwise direction relative to the page as the fourth pin 270D moves along the first cam wheel slot 222A. When the sliding cam plate is in a second unblocking position, this motion may be reversed without interference, such that a push bar may be reliably operated between extended and retracted positions.

According to the embodiment shown in FIG. 7, the ratchet cam 230 (shown transparently for clarity) is configured to rotate between a first engaged ratchet position shown and a second disengaged ratchet position. In the state shown in FIG. 7, the ratchet cam is in a first engaged ratchet position such that the pawl (i.e., catch) 234 is engaged with the ratchet (i.e., progressive blocking element) 232, where the ratchet has a plurality of locking regions corresponding to the number of teeth of the ratchet. The ratchet cam rotates about first pin 270A which also couples to the ratchet cam to the sliding plate (for example, see FIG. 8). When the ratchet cam rotates in a clockwise direction relative to the page (corresponding to the sliding cam plate moving toward a blocking position), a ratchet cam slot 231 is angled towards the ratchet 232. The pawl is constrained to move on one end in the ratchet cam slot 231 and on the other end with the cam wheel 220 via third pin 270C. That is, the pawl moves along the ratchet cam slot 231 when the cam wheel is rotated, and, in particular, the pawl 234 moves closer to the ratchet 232 when the cam wheel rotates in a clockwise direction relative to the page and further away from the ratchet when the cam wheel rotates in a counter-clockwise direction relative to the page when the ratchet cam sot is angled towards the ratchet. The movement of the pawl is such that when the sliding cam plate is in a blocking position and the push bar is moved to the retracted state, the pawl engages the ratchet. Once the pawl can engage the ratchet, the pawl resists movement in the opposite direction. Thus, because the pawl is coupled to the cam wheel at third pin 270C, the cam wheel is unable to rotate and the lever is correspondingly retained in the position shown in FIG. 7 and an associated push bar is dogged. Accordingly, when the pawl is engaged with the ratchet, the cam wheel, pawl, and ratchet in combination function as a blocking element inhibiting the motion of the push bar towards the extended position. In contrast, the pawl does not resist motion of the cam wheel in a clockwise direction relative to the page (corresponding to retracting the exit device). Accordingly, moving the sliding plate may place the dogging mechanism in a dog-on-next-exit state, where retracting (i.e., depressing) the push bar will progressively dog the push bar. That is, the pawl will progressively engage the plurality of locking regions of the ratchet 232 to block movement of the push bar toward the extended position. As will be discussed further with reference to FIG. 8, the ratchet cam may include an over-center ratchet cam spring which selectively biases the ratchet cam towards the first engaged ratchet position or the second disengaged ratchet position. Such an arrangement may ensure consistent and reliable engagement and/or release of the ratchet depending on the position of the sliding cam plate.

Figure 8:
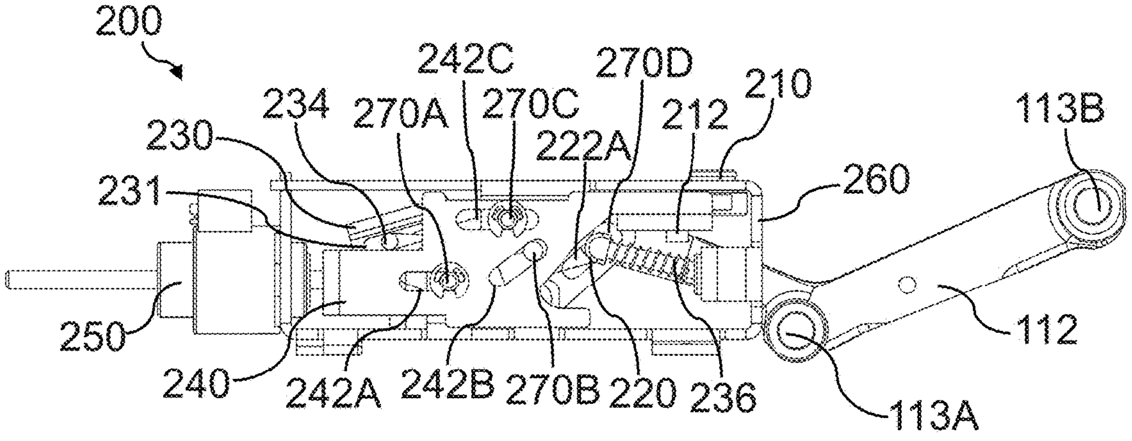
FIG. 8 is a second side elevation view of the dogging mechanism of FIG. 6 in a dogged state.

FIG. 8 depicts an elevation view of a second (i.e., opposite) side of the dogging mechanism 200 of FIG. 6 in the same dogged state shown in FIG. 7. As best shown in FIG. 8, the sliding cam plate 240 controls the motion of the other components, particularly the ratchet cam 230 which directs the pawl 234 into engagement with the ratchet (see FIG. 7). As discussed previously, the sliding cam plate includes a first plate slot 242A, a second plate slot 242B, and a third plate slot 242C, which respectively house first pin 270A, second pin 270B, and third pin 270C. The first pin 270A couples the sliding cam plate to the ratchet cam, the second pin 270B also couples the sliding cam plate to the ratchet cam, and the third pin 270C couples the sliding plate the housing 260, the cam wheel 220, and the pawl 234. The second plate slot 242B is configured to rotate the ratchet cam such that the ratchet cam slot 231 is angled toward the ratchet such that the pawl engages the ratchet when the push bar is moved to the retracted position. That is, the second plate slot 242B is angled such that the second pin 270B is moved upwards relative to the page when the sliding cam plate is moved to the left relative to the page (i.e., towards the blocking position). As the second pin 270B is moved upwards, the ratchet cam rotates counterclockwise relative to the page about the first pin 270A to angle the ratchet cam slot 231 toward the ratchet. Conversely, when the sliding plate is moved to the right relative to the page (i.e., towards an unblocking position), the second pin 270B is moved along the second plate slot 242B in an opposite direction to rotate the ratchet cam clockwise relative to the page to angle the ratchet cam slot away from the ratchet (for example, see FIGS. 9-10). Thus, the movement of the sliding cam plate between a blocking position and an unblocking position selectively changes the state of the dogging mechanism between a dogged state and an undogged state, respectively.

As discussed previously and shown in FIG. 8, the sliding cam plate is moveable between the blocking position and the unblocking position using the manual actuator 210 or the linear actuator 250. The linear actuator may be arranged to receive a hex key and includes a manual actuator pin 212 that engages a fourth plate slot (not shown in the figure) to cammingly move the sliding cam plate between the blocking and unblocking positions. In contrast, the linear actuator 250 is directly coupled to the sliding cam slot, such that activation of the linear actuator in any linear direction will move the sliding cam plate. Actuation of the manual actuator may move the linear actuator and activation of the linear actuator may move the manual actuator such that the actuators may be used independently or in combination to move the sliding cam plate. Of course, while a manual actuator arranged to receive a hex key and a linear actuator are shown in FIG. 8, any suitable actuator may be employed to move the sliding cam plate, as the present disclosure is not so limited.

Figure 10:
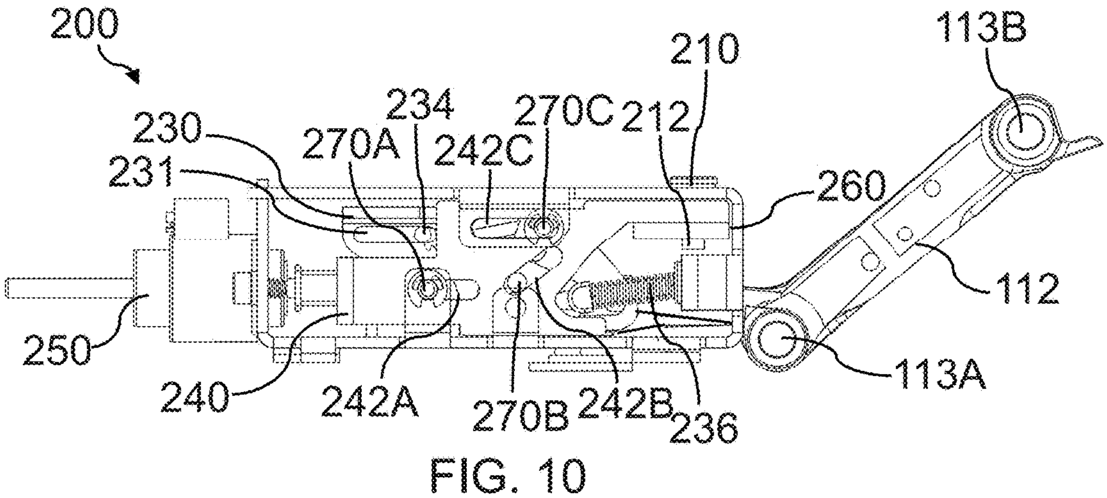
FIG. 10 is a second side elevation view of the dogging mechanism of FIG. 6 in an undogged state.

As shown in FIG. 8, the ratchet cam includes an over-center ratchet cam spring 236 which selectively biases the ratchet cam 230 towards either an ratchet engaged position (shown here in FIG. 8) or a ratchet disengaged position (shown in FIG. 10). That is, based on the rotational position, the direction of the biasing force of the ratchet cam spring may be over or under the center of rotation and may correspondingly bias in one direction or the other. In the ratchet engaged position, it may be desirable to ensure engagement between the pawl and the ratchet is maintained during operation of the door and that dogging mechanism remains in the dogged state under shock loading (e.g., door slamming). Accordingly, in this position, the ratchet cam spring 236 biases the ratchet cam to rotate in a counter-clockwise direction relative to the page corresponding to angling the ratchet cam slot towards the ratchet. Conversely, in the ratchet disengaged position, it may be desirable to ensure the exit device is operable without interference from the dogging mechanism. Accordingly, the ratchet cam spring may bias the ratchet cam to rotate in a clockwise direction relative to the page corresponding to angling the ratchet cam slot away from the ratchet (for example, see FIG. 10). The ratchet cam spring may also ensure reliable action of the various pins and cam slots which cooperate with the ratchet cam. Of course, while an over-center spring is shown in the embodiment of FIG. 8, any suitable biasing or non-biasing arrangement may be employed, as the present disclosure is not so limited.

Figure 9:
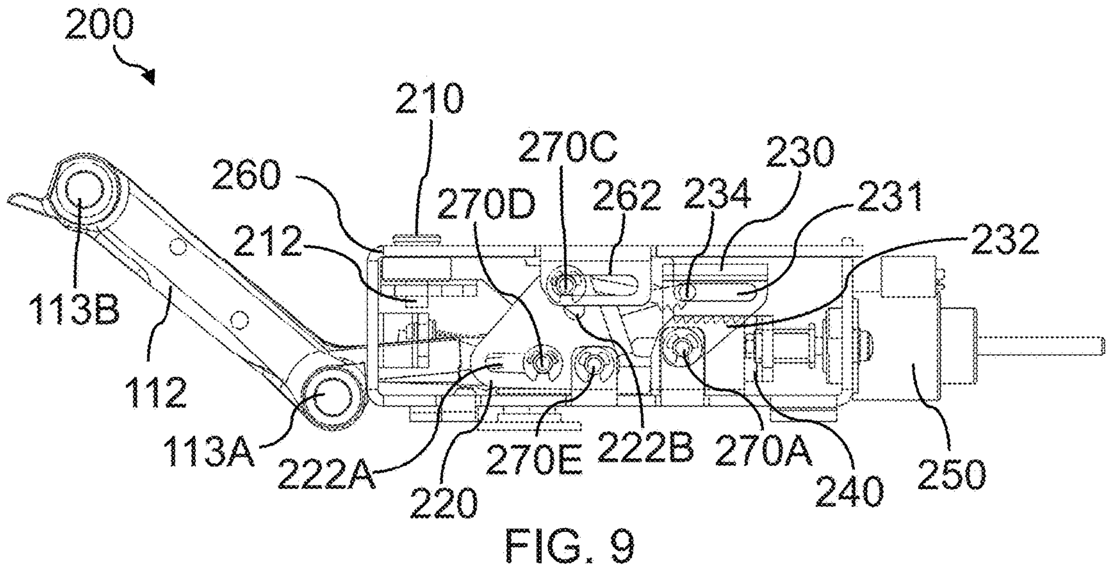
FIG. 9 is a first side elevation view of the dogging mechanism of FIG. 6 in an undogged state.

FIG. 9 is a first side elevation view of the dogging mechanism 200 of FIG. 6 in an undogged state. As shown in FIG. 9 and in contrast to the state shown in FIG. 7, the cam wheel 220 has been rotated counterclockwise relative to the page about the fifth pin 270E. Correspondingly, the lever 112 has rotated counterclockwise relative to the page to increase the vertical distance relative to the page of the second hinge portion 113B from the first hinge portion 113A to move an associated push bar to an extended position. In order to rotate the cam wheel and allow the push bar to move to the extended position, the sliding cam plate 240 was moved to an unblocking position. In the unblocking position, the ratchet cam 230 is rotated in a counterclockwise direction relative to the page such that the ratchet cam slot 231 is parallel with or angled away from the ratchet 232 (e.g., the ratchet disengaged position). When the ratchet cam slot is angled away from the ratchet or is otherwise disposed at a suitable angle, the pawl 234 is moved out of engagement with the ratchet. That is, if the ratchet was previously engaged with the pawl, the pawl will be released when the ratchet cam is rotated toward the ratchet disengaged position. In the ratchet disengaged position, the pawl may move along the ratchet cam slot 231 freely with no interfere from the ratchet 232, such that the cam wheel may also rotate to allow the lever to freely move. In some embodiments, when the pawl is released by the ratchet cam, the lever and cam wheel may automatically return to the position shown in FIG. 9 under urging force from a lever biasing member disposed on the lever 112 or another lever of the push bar.

FIG. 10 is a second side elevation view of the dogging mechanism 200 of FIG. 6 in an undogged state. As shown in FIG. 10, the sliding cam plate 240 has been moved to an unblocking position. In the unblocking position, the second pin 270B has been moved down relative to the page along the second plate slot 242B to rotate the ratchet cam counterclockwise relative to the page about first pin 270A. As the ratchet cam is rotated about first pin 270A, the over-center ratchet cam spring 236 transitions to biasing the ratchet cam to the ratchet disengaged position. As shown in FIG. 10, the ratchet cam sot 231 is approximately parallel with the housing 260 of the dogging mechanism. However, it should be noted that any suitable angle of the ratchet cam slot may be employed to disengage the pawl 234 from the ratchet, as the present disclosure is not so limited. As discussed previously, the linear actuator 250 and/or the manual actuator 210 may be used to move the sliding cam plate to the unblocking position shown in FIG. 10.

Figure 11:
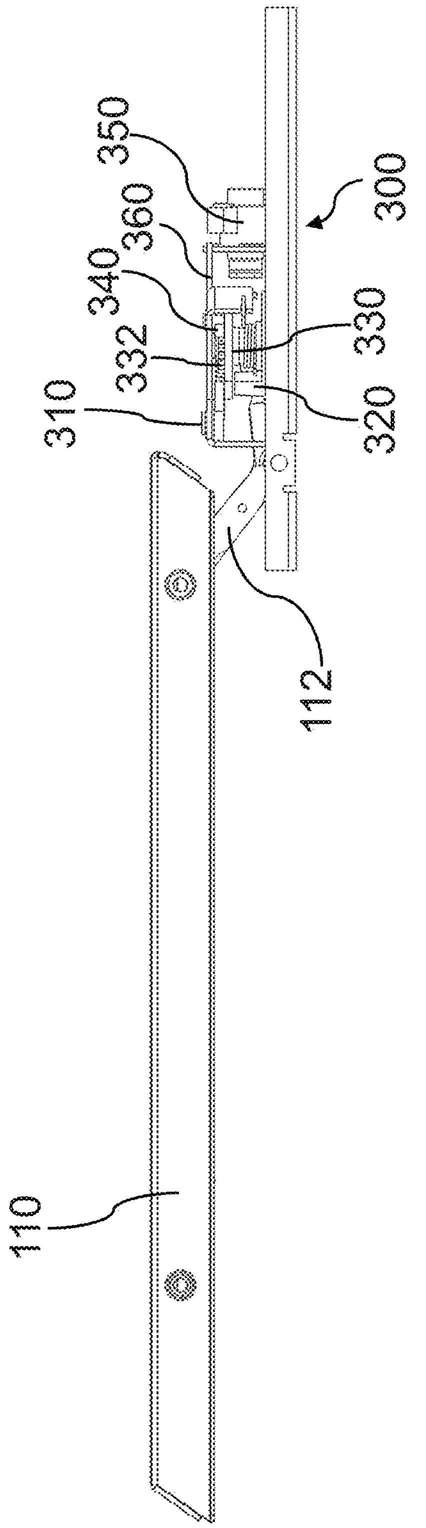
FIG. 11 is a first side elevation view of one embodiment of a push bar and dogging mechanism.

FIG. 11 is a first side elevation view of another embodiment of a push bar 110 and dogging mechanism 300 configured to control (i.e., block) the motion of the push bar via a lever 112. In contrast to the dogging mechanism of FIGS. 4-10, the dogging mechanism 300 includes a rotational cam block 320 which rotates about an axis approximately parallel to a direction of movement of the push bar. The dogging mechanism also includes a ratchet body 330 including a plurality of ratchet teeth (i.e., locking regions) 332 arranged in an arc. The dogging mechanism also includes a pawl body 340 configured to engage the arcuate plurality of ratchet teeth and a housing 360. Similarly to the embodiment of FIGS. 4-10, the dogging mechanism may be controlled with a manual actuator 310 and/or a linear actuator 350.

Figure 12:
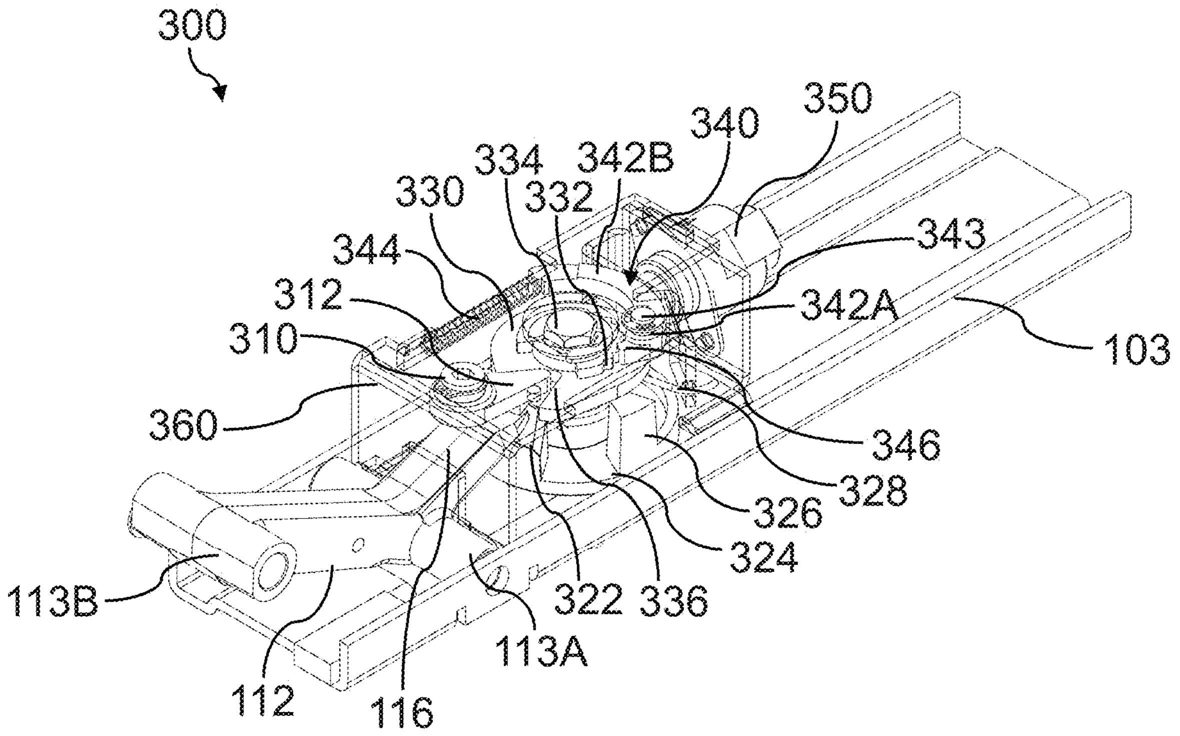
FIG. 12 is a perspective view of the dogging mechanism of FIG. 11.

FIG. 12 is a perspective view of the dogging mechanism 300 of FIG. 11 showing the various components in greater detail (the housing 360 is shown transparently for clarity). The dogging mechanism includes a cam block 320, a ratchet body 330, and a pawl body 340 which together function to control the dogging state of the dogging mechanism (i.e., block or unblock motion of the lever 112). The cam block 320 is configured to rotate about bolt 334 and includes a blocking portion 322, a clearance portion 324, stop portions 326, and a cam block spring 328. The blocking portion 322 is configured to engage a lever end 116 of the lever 112. That is, when the blocking portion is underneath the lever end relative to a rail base 103, the blocking portion prevents rotation of the lever and corresponding prevents movement of an associated push bar toward the extended position. Conversely, the clearance portion 324 which is adjacent the blocking portion allows a full range of motion of the lever 112 and correspondingly allows a full range of motion of an associated push bar. The stop portions 326 (only one of which is shown in FIG. 12) function to maintain the lever end in either the blocking portion or the clearance portion of the cam block. That is, the stop portions prevent the cam block from rotating about the bolt 334 past either the blocking portion or clearance portion. The cam block spring 328 is configured to bias the cam block to rotate such that the clearance portion is aligned with the lever end. The cam block is in a blocking position when the blocking portion engages the lever and the cam block is in an unblocking position when the clearance portion is aligned with the lever end.

According to the embodiment shown in FIG. 12, the dogging mechanism 300 includes a ratchet body 330 which is coupled to the cam block 320 and is configured to rotate about the bolt 334 equally with the cam bolt. That is, the ratchet body rotates with the cam block and accordingly is also biased by the cam block spring 328. The ratchet body includes a plurality of ratchet teeth 332 (forming a plurality of locking regions) configured to engage the pawl body 340. The ratchet body also includes a ratchet body cam slot 336 which is configured to engage the manual actuator 310. The manual actuator includes a manual actuator cam 312 which engages the ratchet body cam slot such that the ratchet body may be rotated when the manual actuator is rotated. According to the embodiment of FIG. 12, the manual actuator may be rotated by a hex key. Thus, the manual actuator may be rotated to rotate the cam block between a blocking position and an unblocking position.

As shown in FIG. 12, the dogging mechanism 300 includes a pawl body 340 which is configured to engage the plurality of ratchet teeth 332 on the ratchet body 330. The pawl body includes a first pawl leg 342A and a second pawl leg 342B disposed on opposite sides of a pawl pin 343. The pawl is configured to rotate about the pawl pin, and is rotatably coupled to the housing 360. The first pawl leg includes a pawl tooth which engages one of the plurality of ratchet teeth 332. Of course, while a single pawl tooth is shown in the embodiment of FIG. 12, any suitable number of pawl teeth may be employed as the present disclosure is not so limited. The second pawl leg is coupled to a pawl spring (i.e., pawl biasing element) 344 which is configured as a compression spring disposed between the housing 360 and the second pawl leg. The pawl spring biases the pawl into engagement with the plurality of ratchet teeth, as the pawl spring urges the pawl body to rotate about the pawl pin 343 in a clockwise direction relative to the page, thereby moving the pawl tooth closer to the plurality of ratchet teeth. According to the embodiment shown in FIG. 12, the linear actuator 350 is configured to apply a force to the second pawl leg opposing the biasing force of the pawl spring 344. Accordingly, the linear actuator may rotate the pawl body in a counterclockwise direction relative to the page to move the pawl out of engagement with the ratchet teeth. As will be discussed further below, moving the pawl out of engagement with the plurality of ratchet teeth may allow biasing force from the cam block spring 328 to move the cam block to the unblocking position.

Figure 13:
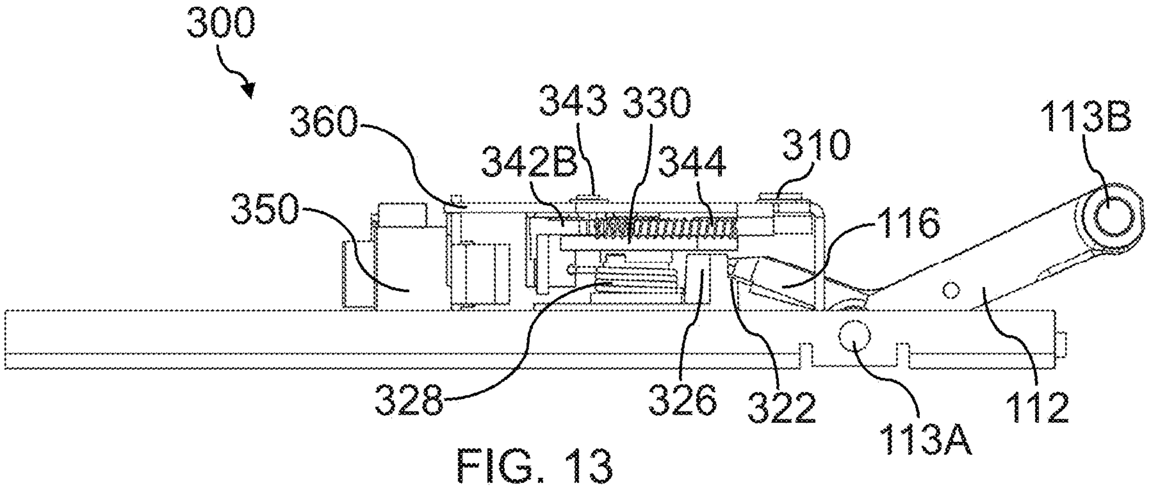
FIG. 13 is a second side elevation view of the dogging mechanism of FIG. 11 in a dogged state.
Figure 14:
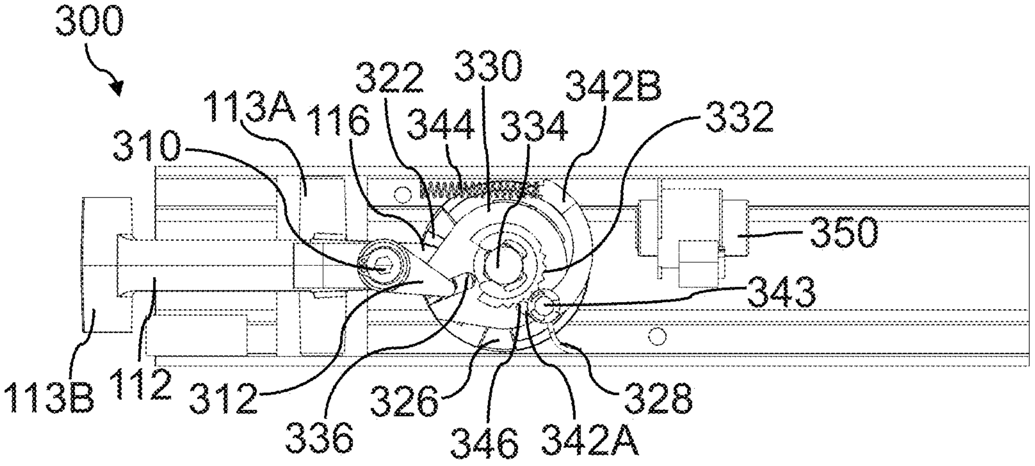
FIG. 14 is a top plan view of the dogging mechanism of FIG. 11 in a dogged state.

FIGS. 13 and 14 depict a second side elevation view and top view, respectively, of the dogging mechanism 300 of FIG. 11 in a dogged state. As shown in FIGS. 13-14, the cam block is in a blocking position with the blocking portion 322 engaging the lever end 116 of the lever 112. The stop portion 326 prevents over rotation of the cam block so that the blocking portion remains engaged with the lever end. As discussed previously, the cam block spring 328 urges the cam block so that the clearance portion is aligned with the lever end. Accordingly, in the position shown in FIGS. 13-14, the rotation of the cam block under urging from the cam block spring 328 is resisted by the pawl body 340 and ratchet body 330. That is, the pawl spring 344 urges the pawl tooth 346 into engagement with the plurality of ratchet teeth 332. The urging force of the pawl spring and the cam block spring are balanced such that the pawl spring may reliably retain the cam block in the blocking position against the urging of the cam block spring. As the plurality of ratchet teeth form a plurality of locking regions, the pawl may progressively latch the cam block at any of the ratchet teeth. As best shown in FIG. 14, the manual actuator 310 may be rotated so that the manual actuator cam 312 rotates the cam block via ratchet body slot 336.

In the embodiment shown in FIGS. 13-14, the manual force applied by the manual actuator 310 may be sufficient to overcome the biasing force of the pawl spring 344 and the cam block spring 328. That is, the manual actuator may be used to move the ratchet body when the pawl is engaged with the plurality of ratchet teeth as the force applied via the manual actuator may be sufficient to rotate the pawl out of engagement with a particular ratchet tooth. Accordingly, the manual actuator may be used to move the cam block to any desirable position (e.g., a blocking position or unblocking position), and the ratchet body and pawl may retain the cam block in the desired position. In contrast, the linear actuator may be employed to release the pawl from the ratchet body by applying a force to the second pawl leg 342B. When a force is applied directly to the second pawl leg, the pawl may disengage the plurality of ratchet teeth and the cam block spring may move the cam block to the unblocking position. Thus, in the present embodiment the linear actuator may be employed to undog the dogging mechanism (i.e., move the cam block to the unblocking position), but may not be employed to dog the dogging mechanism. Of course, in other embodiments, a linear actuator or other suitable powered actuator may be employed to dog the device in a similar manner to that of the manual actuator, as the present disclosure is not so limited.

Figure 15:
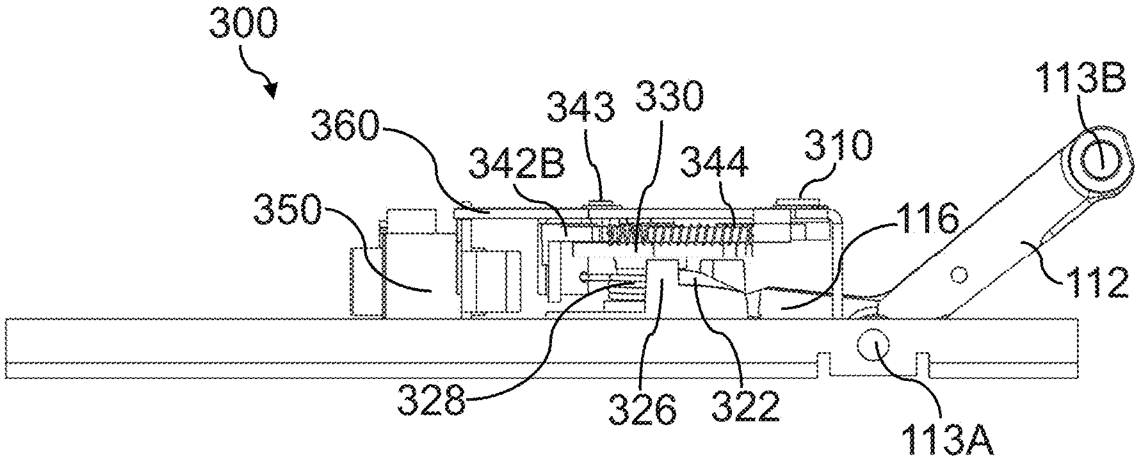
FIG. 15 is a second side elevation view of the dogging mechanism of FIG. 11 in an undogged state.
Figure 16:
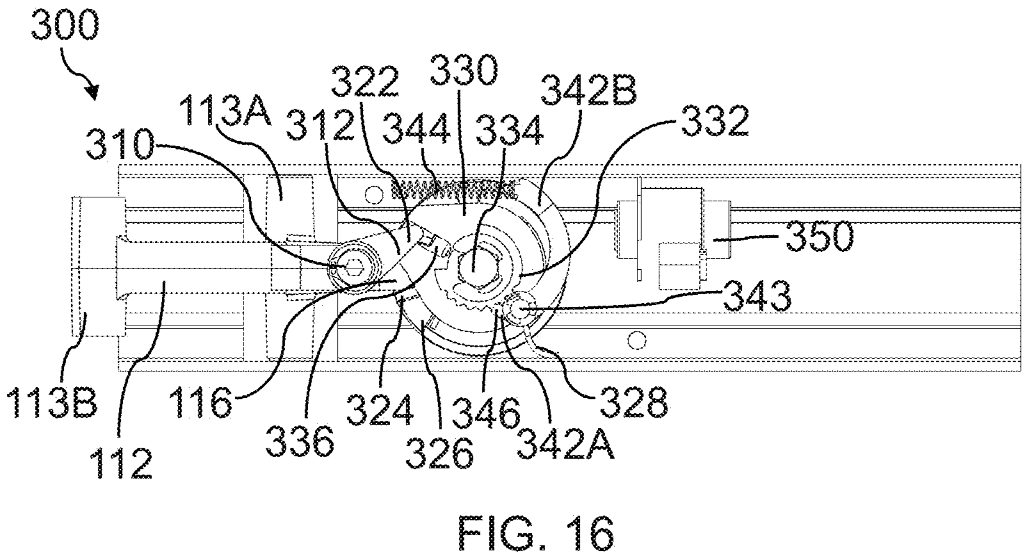
FIG. 16 is a top plan view of the dogging mechanism of FIG. 11 in an undogged state.

FIGS. 15-16 depict a second side elevation view and top plan view, respectively, of the dogging mechanism 300 of FIG. 11 in an undogged state. As best shown in FIG. 15, the dogging mechanism 300 is an in undogged state when the clearance portion of the cam block 320 is aligned with the lever end. That is, the blocking portion 322 is moved out of alignment with the lever end so that the lever may freely rotate to extend and retract an associated push bar. As shown in FIG. 15, the second hinge portion 113B is vertically further from the first hinge portion 113A relative to the page, corresponding to an associated push bar being in an extended position. As shown in FIG. 16, the cam block and ratchet body 330 have been rotated in a clockwise direction relative to the page when compared with FIG. 14. This rotation may be induced by turning the manual actuator 310 (e.g., with a hex key) or may be induced by releasing the pawl body 340 from the plurality of ratchet teeth 332. For example, the second pawl leg 342B may be depressed by the linear actuator 350 to rotate the pawl about pawl pin 343 and release the pawl tooth 346 from the plurality of ratchet teeth. Of course, in other embodiments, the manual actuator and/or another actuator may be employed to rotate the pawl body and disengage the plurality of ratchet teeth, as the present disclosure is not so limited.

According to the embodiment shown in FIGS. 15 and 16, the manual actuator 310 may be used to exert a force greater than the holding force of the pawl tooth 346 engaged with the plurality of ratchet teeth 332. That is, the manual actuator exerts a force on the ratchet body via ratchet body slot 336 suitable to cam the pawl body out of engagement with a ratchet tooth against the force of the pawl spring 344. Accordingly, the pawl spring may cause the pawl tooth 346 to progressively engage each of the plurality of ratchet teeth as the ratchet body is rotated by the manual actuator 310. When the manual actuator is released, the pawl may hold the ratchet body in any rotational position the ratchet body is in. Conversely, moving the dogging mechanism to the undogged state by applying a force to the second pawl leg 342B may cause the pawl tooth 346 to clear the plurality of ratchet teeth completely, such that the ratchet body rotates under urging from the cam block spring 328 until one of the stop positions 326 prevent further rotation. Thus, the dogging mechanism shown in FIGS. 15-16 allows for multiple methods of dogging and undogging.

Figure 17:
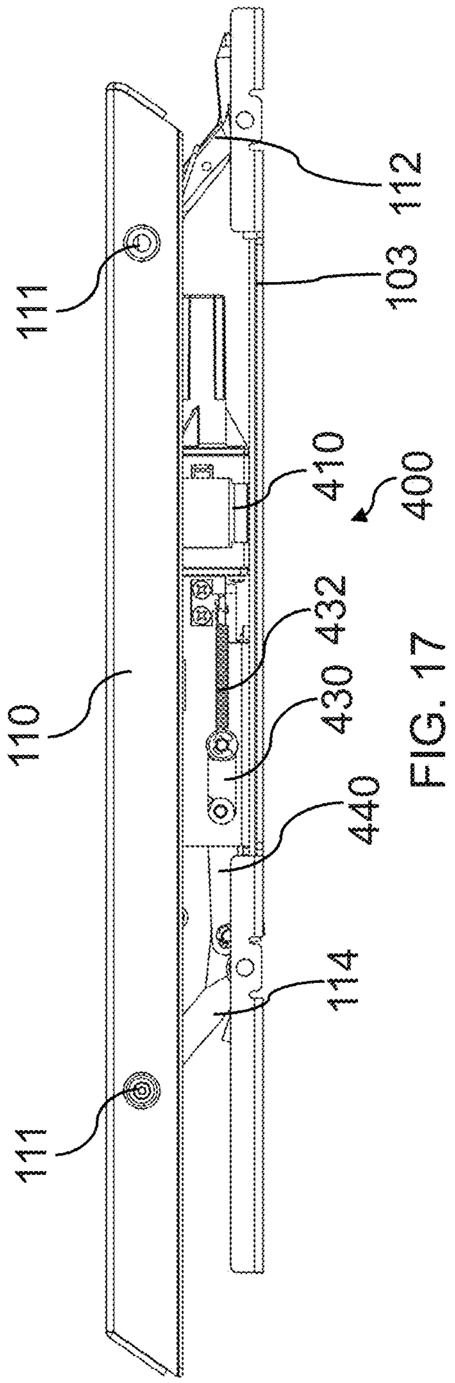
FIG. 17 is a first side elevation view of one embodiment of a push bar and an electronic latch retraction device.

FIG. 17 is a first side elevation view of one embodiment of a push bar 110 and an electronic latch retraction device 400 configured to electronically retract the push bar. As discussed previously, the push bar 110 may interact with an associated latch with a lever which changes the latch between an engaged position and a disengaged position as the push bar moves between an extended and retracted position, respectively. Accordingly, retracting the push bar itself may retract (i.e., disengage) the associated latch so that the door may be opened or placed in a dogging state. As shown in FIG. 17, the electronic latch retraction device 400 includes an actuator (e.g., motor, stepper motor, linear actuator, and/or any other suitable electromechanical actuator) 410, a first linkage (see FIGS. 19-20), a cam wheel 430, and a second linkage 440. Together, the first linkage, cam wheel, and second linkage cooperate to actuate a second lever 114 coupled to the push bar. The combination of the first linkage, cam wheel, and second linkage allows for a force applied to the second lever 114 by the second linkage (e.g., force output portion) to be 1.2 to 2 times greater than a force applied by the linear actuator to the first linkage (e.g. force input portion). This mechanical advantage allows the actuator to use less energy to retract the push bar.

Figure 18:
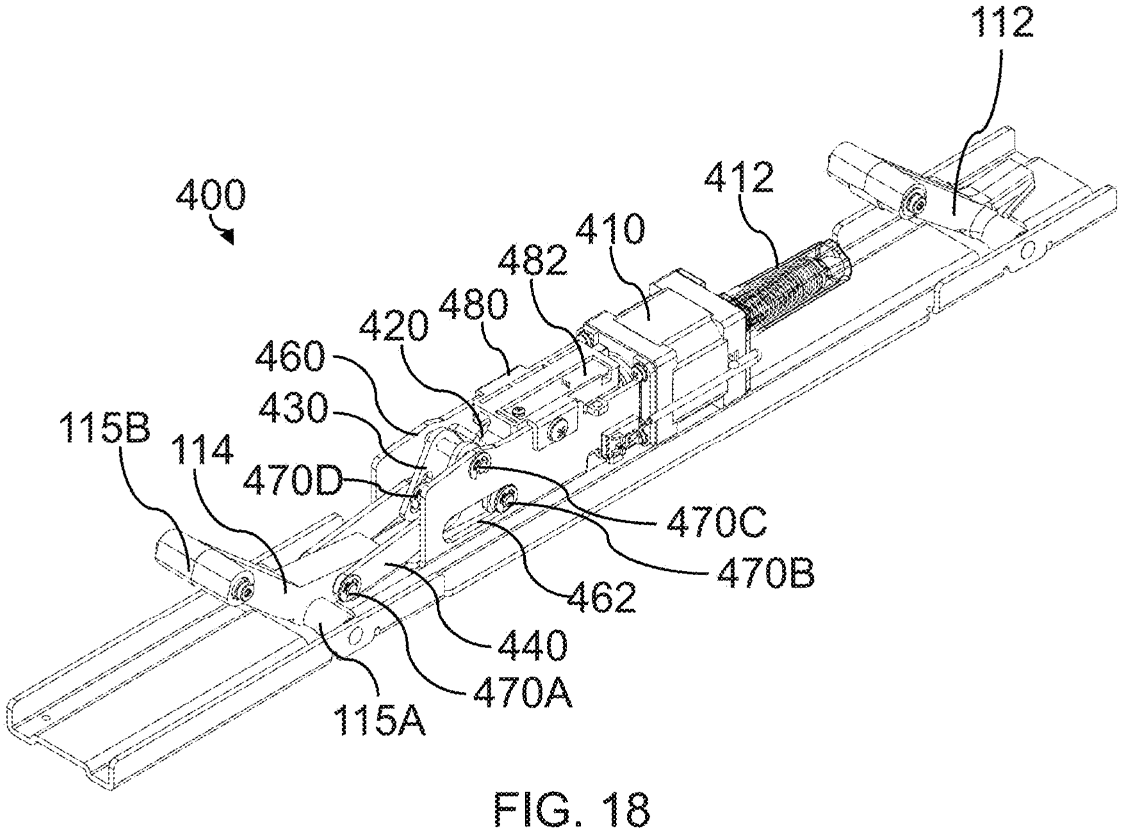
FIG. 18 is a perspective view of the electronic latch retraction device of FIG. 17.

FIG. 18 is a perspective view of the electronic latch retraction device 400 of FIG. 17 showing the components in greater detail. As discussed previously, the electronic latch retraction device includes an actuator 410, a first linkage 420, a cam wheel 430, and a second linkage 440. The electronic latch retraction device also includes a housing 460 which at least partially houses the components and functions to constrain the motion of the first linkage and the cam wheel. The actuator shown in FIG. 18 is configured as a linear actuator with a stepper motor. With a lead screw disposed in a lead screw housing which may be used to apply linear force in either direction to the first linkage. The first linkage is coupled to the actuator and is configured to move between a first linear position and a second linear position. The first linkage is coupled to the cam wheel via a second pin 470B which is disposed in a housing cam slot 462 formed in the housing 460. The housing cam slot constrains the second pin 470B to substantially linear movement. The cam wheel 430 is rotationally coupled to the housing 460 via third pin 470C, which allows the cam wheel to rotate about the third pin when the second pin 470B is moved along the housing cam slot 462. Third pin 470C is positioned away from a geometric center of the cam wheel so that the cam wheel may function as a lever when moved. The cam wheel is also coupled to the second linkage 440 via a fourth pin 470D. The second linkage couples the cam wheel to the second lever 114 and ultimately transmits the force from the actuator 410 to the lever. The second linkage is also coupled to the lever 114 via a first pin 470A. The movement of the first linkage, cam wheel, and second linkage will be described further with reference to FIGS. 19-20. As shown in FIG. 18, the electronic latch retraction device 400 also includes a cam wheel spring 432 configured to bias the electronic latch retraction device toward the extended position.

According to the embodiment shown in FIG. 18, the electronic latch retraction device 400 also includes an encoder 480 which is configured to measure the position of an associated push bar. The encoder of FIG. 18 is configured to measure the position of the first linkage 420. However, other encoder arrangements are contemplated, including encoders which measure the position of the cam wheel 430, second linkage 440, second lever 114, or an associated push bar itself. The encoder may be employed to provide feedback control for the actuator 410. For example, the encoder may be used to turn off the actuator when the associated push bar is fully retracted. As another example, the encoder may be used to monitor to the functionality of the exit device, including wear, added friction, or other issues which may be addressed through maintenance or modification of the force applied by the actuator. Of course, the encoder may be used to provide information that may enable any desirable functionality of the exit device, as the present disclosure is not so limited. According to the embodiment of FIG. 18, the encoder is configured as a Hall Effect sensor which is disposed on a circuit board 482 and is configured to measure the position of a magnet which travels with the first linkage, as will be discussed further with reference to FIGS. 22-23.

Figure 19:
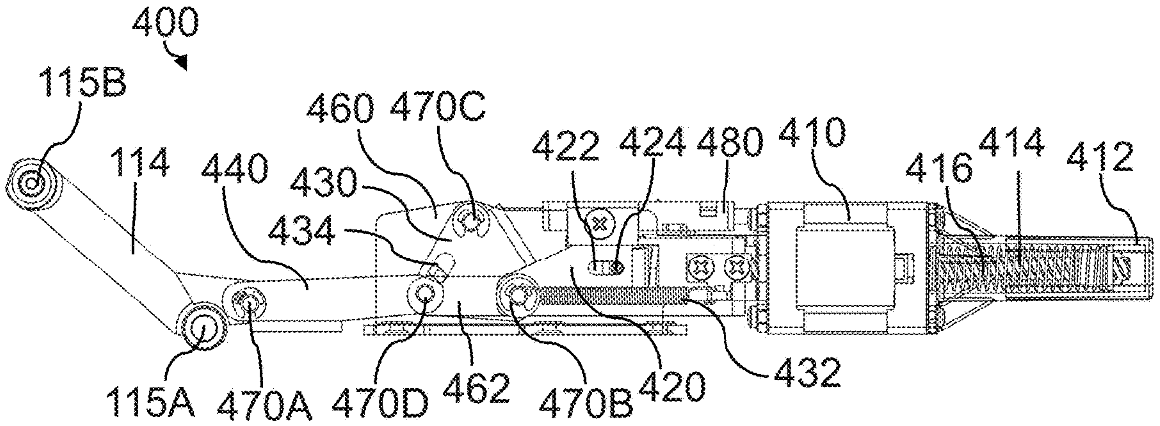
FIG. 19 is a first side elevation view of the electronic latch retraction device of FIG. 17 in an extended state.

FIG. 19 is a first side elevation view of the electronic latch retraction device 400 of FIG. 17 in an extended state. That is, the second lever 114 is in a position which corresponds to an associated push bar being in an extended position. The first linkage 420 is in a first linear position which is closest to the actuator 410. Accordingly, the cam wheel 430 is rotated to a position about the third pin 470C where the second linkage is substantially parallel to the first linkage. The second linkage is coupled to the cam wheel 430 in cam wheel slot 434, which allows the cam wheel to rotate without inference. Similarly, the second linkage allows the second lever 114 to rotate independently of the cam wheel when an associated push bar is manually actuated. From the position shown in FIG. 19, the actuator is configured to apply a pushing (i.e., compression) force to the first linkage 420 via a lead screw 414. The lead screw is disposed in a lead screw housing 412 which supports and protects the lead screw. The lead screw housing also includes a lead screw return spring 416 which assists in moving the lead screw into the housing (i.e., in a direction opposite the direction where a pushing force is applied to the first linkage). When the actuator 410 applies a pushing force to the first linkage, the first linkage moves toward a second linear position and will correspondingly move the second pin 470B along the housing slot 462 in a left direction relative to the page. As the second pin moves along the housing slot, the cam wheel 430 will rotate about the third pin 470C in a clockwise direction relative to the page from a first rotational position shown in FIG. 19 toward a second rotational position. As the cam wheel rotates, the second linkage is drawn up along with the cam wheel at fourth pin 470D. That is, the second linkage is rotated and moved in a linear direction as the cam wheel is rotated. The second linkage is put under a tension force, which actuates the second lever 114 to retract an associated push bar.

As shown in FIG. 19, the electronic latch retraction device 400 includes an overrunning coupling between the first linkage and the actuator 410 formed by an overrun pin 424 disposed in an overrun slot formed in the first linkage. The overrun pin is connected to the lead screw 414 and typically transmits the force from the lead screw to the first linkage. However, in cases where the first linkage is unable to move (e.g., when the push bar is fully retracted), it may be desirable to prevent overloading of the actuator 410. Accordingly, the overrun pin 424 may slide in the overrun slot 422 formed in the first linkage when the first linkage is stopped. Accordingly, the overrun slot 422 may provide a predetermined amount of overrun for the actuator where the actuator will not be overloaded. In the embodiment of FIG. 19, the first pin 424 is coupled to the first linkage via an overrun spring (see FIG. 21) which is suitably stiff to allow force to be transmitted to the first linkage for retracting a push bar, but absorbs displacement generated by the actuator when the first linkage is stopped. That is, as the overrun pin moves in the overrun slot 422, the overrun spring absorbs the excess displacement which may otherwise damage the first linkage.

Figure 20:
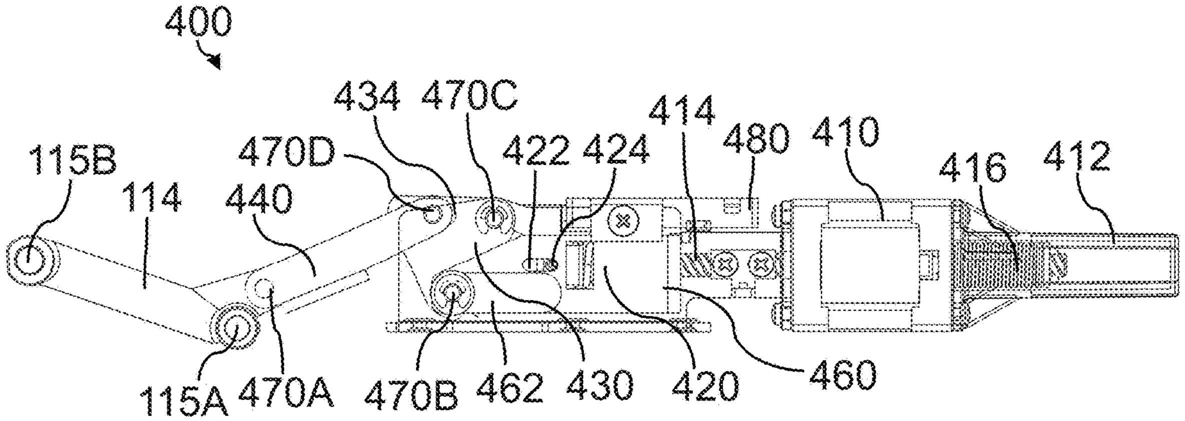
FIG. 20 is a first side elevation view of the electronic latch retraction device of FIG. 17 in a retracted state.

FIG. 20 is a first side elevation view of the electronic latch retraction device 400 of FIG. 17 in a retracted state which corresponds to an associated push bar being in a retracted position. As shown in FIG. 20, the first linkage 420 is in the second linear position, with the second pin 470B disposed in a side of the housing slot furthest from the actuator 410. The cam wheel 430 is in a second rotational position, where the cam wheel has been rotated counterclockwise relative to the page about third pin 470C when compared with FIG. 19. Accordingly, the second linkage 440 has been lifted by fourth pin 470D and is applying a tension force for to the second lever 114 via first pin 470A. The second lever 114 has been rotated about a first hinge portion 115A so that a second hinge portion 115B is disposed closer to the first hinge portion relative to the page. Accordingly, an associated push bar is moved to the retracted position when the electronic latch retraction device is in the retracted state shown in FIG. 20. The rotation of the cam wheel functions as a lever which provides mechanical advantage for the actuator 410 relative to the second linkage 440. That is, the force applied to the lever by the second linkage may be 1.2 to 2 times greater than the force applied to the first linkage by the actuator. Of course, in other embodiments, the cam wheel and linkages may be sized to provide mechanical advantage greater than or less than the amounts noted above, as the present disclosure is not so limited.

Figure 21:
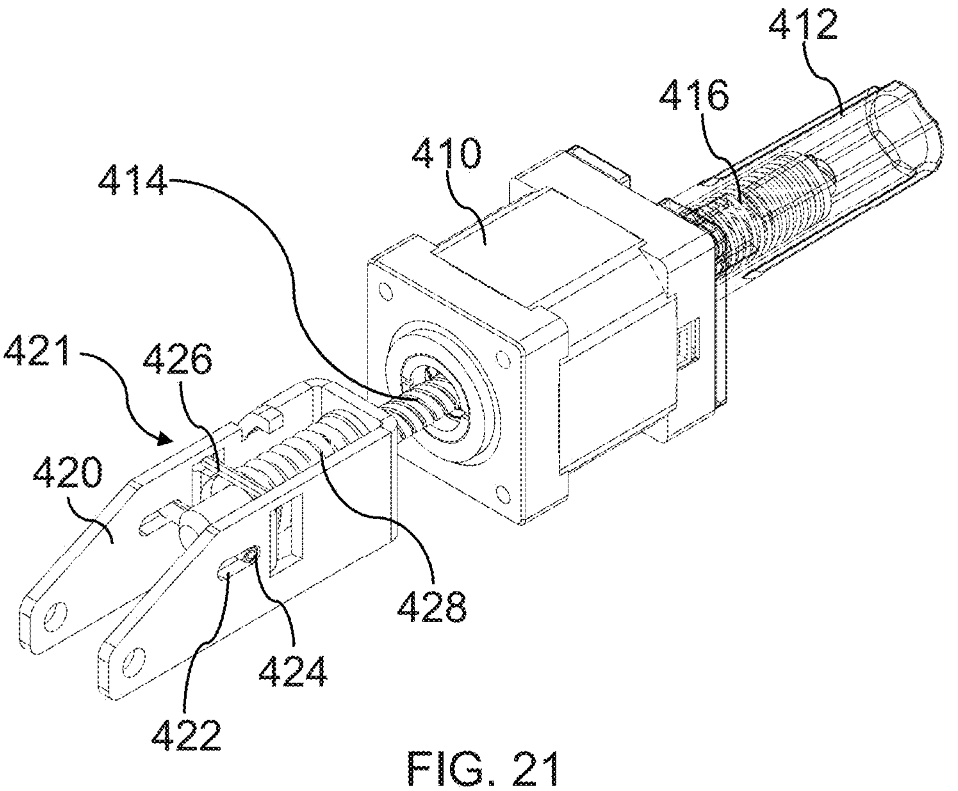
FIG. 21 is a perspective view of one embodiment of an actuator for an electronic latch retraction device.

FIG. 21 is a perspective view of one embodiment of an actuator 410 for an electronic latch retraction device. As discussed previously the actuator 410 (which may be arranged as a stepper motor or other suitable motor) rotates a lead screw 414 to apply a force a first linkage 420. The lead screw 414 is coupled to the first linkage by an overrun coupling 421 including a overrun pin 424, a push plate 426, and an overrun spring 428. The overrun pin 424 is coupled to the push plate via the overrun spring. That is, force transmitted from the overrun pin to the push plate is transferred by the overrun spring. During normal retraction operation, the lead screw applies force the overrun pin 424 and the spring 428 is of suitable stiffness to transfer the force to the push plate with minimal deformation of the spring. However, when the first linkage in unable to move (such as when a push bar is fully retracted), the overrun spring 428 may begin to compress to absorb the displacement of the overrun pin. When this occurs, the overrun pin slides in the overrun slot 422 so that the displacement of the lead screw 441 does not damage the first linkage or actuator 410. An associated increase in the actuation force applied by the actuator when the overrun pin is sliding in the overrun slot may be detected so that the actuator may be stopped. Alternatively, an encoder may be used to determine the first linkage 422 is not moving while the actuator is applying force so that the actuator may be stopped. In any case, the overrun coupling 421 may allow the actuator to reliably actuate a push bar to a fully retracted position while ensuring excess deformation is compensated for and does not damage or excessively wear any components of the electronic latch retraction device.

Figure 22:
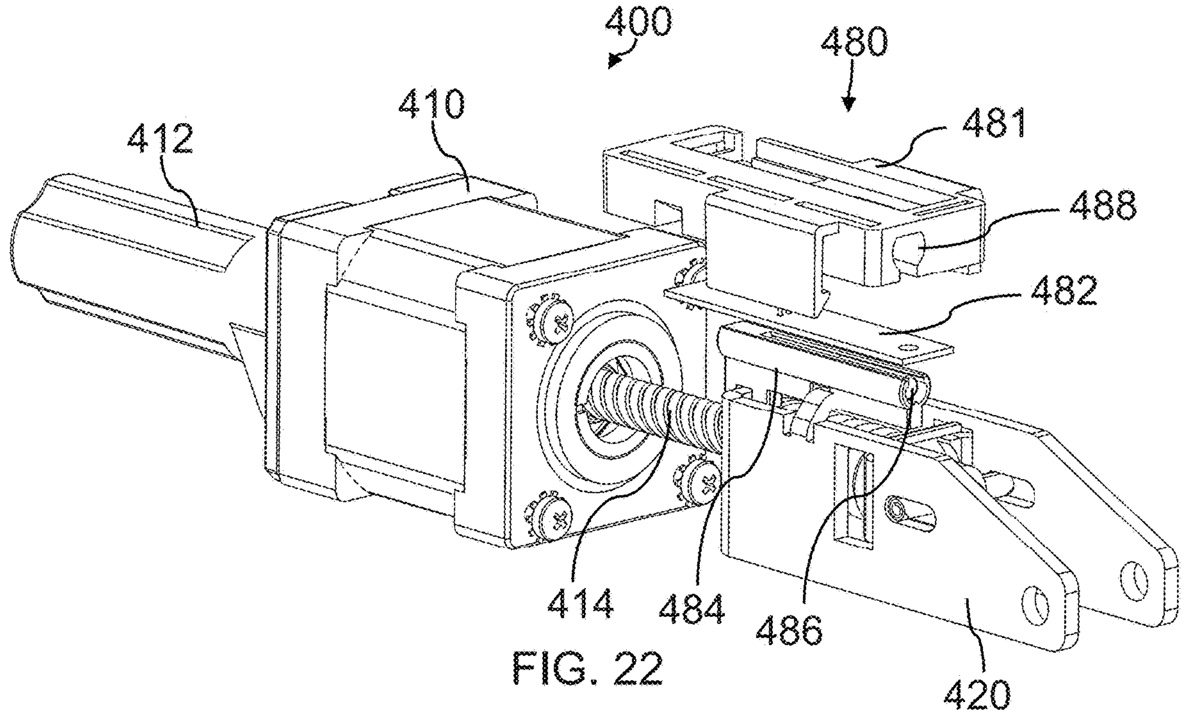
FIG. 22 is a perspective view of one embodiment of an actuator and an encoder for an electronic latch retraction device.

FIG. 22 is an exploded perspective view of one embodiment of an actuator 410 and an encoder 480 for an electronic latch retraction device 400. According to the embodiment shown in FIG. 22, a housing of the electronic latch retraction device is removed and a housing 481 of the encoder is exploded to show the components of the encoder. The encoder includes a circuit board (e.g., PCB) 482 including a Hall Effect sensor as well as a magnet 486 disposed in a magnet sled 484. The magnet sled 484 is coupled to the first linkage and moves linearly with the movement of the first linkage 420 along a magnet channel 488 formed in the encoder housing 481. The Hall Effect sensor remains stationary and senses the intensity of the magnetic field as the magnet sled moves relative to the Hall Effect sensor. Without wishing to be bound by theory, the Hall Effect sensor may measure a linear slope of the magnetic field intensity as the first linkage moves from a first linkage position to a second linkage position. The encoder may provide information to a remote or local controller which may be employed to control one or more devices of the exit device. In particular, the encoder information may be used to provide feedback control for the actuator 410 so that the actuator stops and starts at desirable states and/or time (e.g., when an associated push bar is in a fully retracted or a fully extended position). Of course, while the encoder of FIG. 22 employs a magnet and Hall Effect sensor, any suitable encoder may be employed, including potentiometers, optical encoders, rotary encoders, or any other appropriate sensor.

Figure 23:
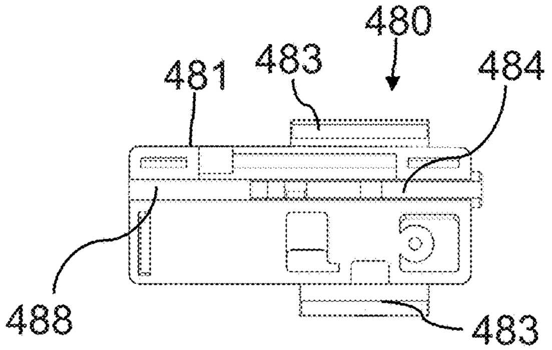
FIG. 23 is a bottom plan view of the encoder of FIG. 22.

FIG. 23 is a bottom plan view of the encoder 480 for the electronic latch retraction device of FIG. 22. As shown in FIG. 23, the encoder includes an encoder housing 481 which houses a magnet sled 484 and a circuit board having a Hall Effect sensor (see FIG. 22). The encoder housing may be mounted to a housing of the electronic latch retraction device via one or more encoder attachment portions 483. The encoder housing may be mounted such that the housing is stationary relative to the moving components of the electronic latch retraction device. The magnet sled 484 holds a magnet and is configured to slide in a magnet channel 488 formed in the encoder housing. The magnet channel is substantially linear, so that the magnet sled is constrained to move linearly relative to the encoder housing and Hall Effect sensor. Such an arrangement may be beneficial to ensure robust and repeatable readings of the position of the components of the electronic latch retraction device. For example, the magnet sled and magnet channel may significantly reduce the susceptibility of the encoder to tolerance stacking or mechanical drift. According to the embodiment of FIG. 23, the encoder housing and magnet sled may be injection molded plastic so that tight tolerances of the magnet sled in the encoder housing are ensured. Of course, the encoder housing and sled may be composed of any suitable material using any suitable manufacturing process, as the present disclosure is not so limited.

Figure 24:
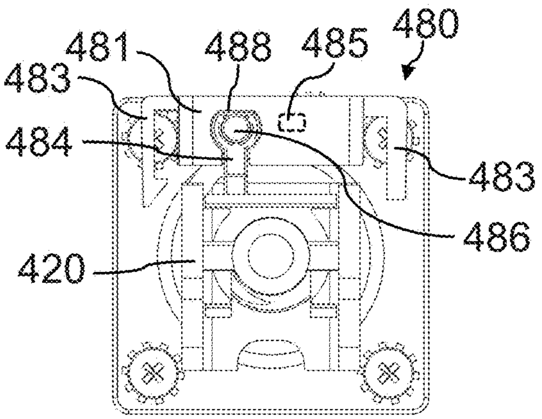
FIG. 24 is a third side elevation view of the encoder and actuator of FIG. 22.

FIG. 24 depicts a third side elevation view of the actuator 410 and encoder 480 of FIG. 22. As shown in FIG. 24 and discussed previously, the magnet sled 484 is configured to slide within magnet channel 488 so that a Hall Effect sensor 485 disposed in the encoder housing 481 may measure a difference in magnetic field strength corresponding to the position of the first linkage 420. According to the embodiment of FIG. 24, the magnet channel is formed with a "D-shape" and the magnet sled has a corresponding shape so that the magnet sled is constrained to move solely in a linear direction. Of course, the magnet channel and magnet sled may have any suitable shape as the present disclosure is not so limited.

Figure 25:
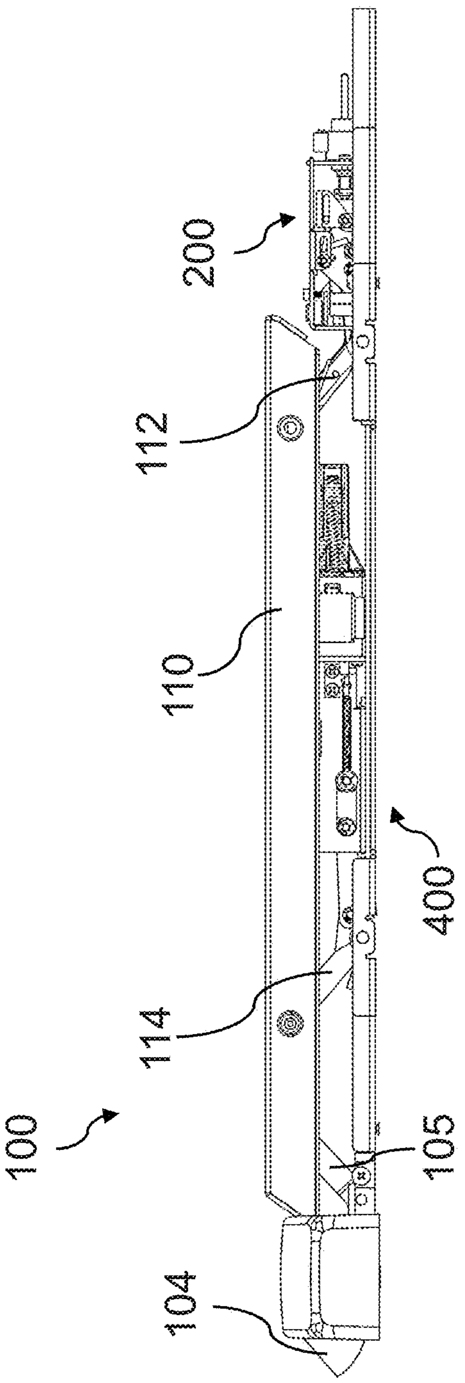
FIG. 25 is a first side elevation view of one embodiment of an exit device including an electronic latch retraction device and a dogging mechanism.

FIG. 25 is a first side elevation view of one embodiment of an exit device 100 including an electronic latch retraction device 400 and a dogging mechanism 200. The dogging mechanism is similar to that of FIGS. 4-10 and is configured to maintain a push bar 110 in a retracted position when the dogging mechanism is in a dogged state. The dogging mechanism manipulates a first lever 112 to block or unblock the motion of the push bar from the retracted position to an extended position. The latch retraction device is similar to that of FIGS. 17-20 and is configured to retract a push bar 110 via a second lever 114. When the push bar is retracted, a latch 104 of the exit device may be retracted by a latch lever 105. When used in combination as shown in FIG. 25, the electronic latch retraction device and the dogging mechanism may enable automatic or remotely controlled latching, unlatching, dogging, and undogging. The electronic latch retraction device and dogging mechanism may also allow for full manual latching, unlatching, dogging, and undogging.

In some embodiments, a method for operating an exit device includes engaging a ratchet and a pawl of a dogging mechanism. For example, a pawl may be cammed into engagement with the ratchet, or a biasing spring may urge the pawl into engagement with the ratchet. The method may also include blocking motion of a push bar from a retracted position toward an extended position using the ratchet and the pawl. For example, the ratchet and pawl may retain a blocking portion in a blocking position, thereby preventing the movement of the push bar toward the extended position. The method may also include disengaging the ratchet and the pawl, thereby allowing motion of the push bar from the retracted position toward the extended position. The push bar may extend automatically when the push bar is released under an urging force from one or more lever biasing members. In some embodiments, the method may also include allowing motion of the push bar from the extended position toward the retracted position when the ratchet and pawl are engaged. That is, the dogging mechanism may be placed in a dog-on-next-exit state so that when the push bar is next retracted the exit device remains dogged. According to this embodiment, an electronic latch retraction device may be employed to retract the push bar after the dogging mechanism is in the dog-on-next-exit state. Accordingly, the door may be dogged remotely without operator intervention. In some embodiments, engaging and/or releasing the ratchet and pawl may be completed remotely via a linear actuator. In some embodiments, engaging and/or releasing the ratchet and pawl may be completed manually via a tool such as a key. Thus, according to embodiments described herein, the exit device may be operated manually or electronically at a remote or local location, as the present disclosure is not so limited.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. An electronic latch retraction device for an exit device, the exit device including a push bar configured to move between an extended position and a retracted position, the electronic latch retraction device comprising:

an electromechanical actuator;

a force input portion configured to receive force from the electromechanical actuator;

a force output portion configured to transmit the force received by the force input portion to the push bar to move the push bar to the retracted position, wherein the force transmitted to the push bar to the move the push bar to the retracted position is between 1.2 and 2 times greater than the force received by the force input portion; and a cam wheel coupling the force input portion to the force output portion, wherein the cam wheel is coupled to the force input portion with a first pin, wherein the cam wheel is configured to rotate about an axis of a second pin between a first rotational position and a second rotational position in response to movement of the force input portion, wherein the cam wheel is coupled to the force output portion with a third pin configured to move along a slot of the cam wheel, and wherein the force output portion is configured to rotate and move in a linear direction as the cam wheel is rotated.

2. The electronic latch retraction device of claim 1, wherein the force received by the force input portion is a compression force.

3. The electronic latch retraction device of claim 2, wherein the force transmitted to the push bar is a tension force.

4. The electronic latch retraction device of claim 1, wherein the axis of the second pin is off center from a geometric center of the cam wheel.

5. An electronic latch retraction device for an exit device, the exit device including a push bar configured to move between an extended position and a retracted position, the electronic latch retraction device comprising:

an electromechanical actuator;

a first linkage coupled to the electromechanical actuator, wherein the first linkage is configured to move in a linear direction between a first linear position and a second linear position;

a cam wheel coupled to the first linkage with a first pin, wherein the cam wheel is configured to rotate about an axis of a second pin between a first rotational position and a second rotational position when the first linkage moves between the first linear position and the second linear position; and a second linkage coupled to the cam wheel with a third pin configured to move along a slot of the cam wheel, wherein the second linkage is configured to be coupled to a lever of the exit device, wherein the second linkage is configured to actuate the lever when the cam wheel rotates from the first rotational position to the second rotational position, and wherein the second linkage is configured to rotate and move in a linear direction as the cam wheel is rotated.

6. The electronic latch retraction device of claim 5, wherein the axis of the second pin is off center from a geometric center of the cam wheel.

7. The electronic latch retraction device of claim 6, wherein a portion of the cam wheel is constrained to move in a linear direction when the cam wheel rotates between the first rotational position and the second rotational position.

8. The electronic latch retraction device of claim 7, further comprising a housing, and wherein the portion of the cam wheel is disposed in a linear slot formed in the housing.

9. The electronic latch retraction device of claim 5, further comprising an overrunning coupling disposed between the electromechanical actuator and the first linkage, wherein the overrunning coupling is configured to absorb displacement of a lead screw of the electromechanical actuator when the lever is moved to a fully actuated state.

10. The electronic latch retraction device of claim 5, further comprising an encoder, wherein the encoder is configured to measure the position of the lever.

11. The electronic latch retraction device of claim 10, wherein the encoder is a linear encoder, and wherein the encoder is coupled to the first linkage to measure the position of the first linkage.

12. The electronic latch retraction device of claim 11, wherein the encoder includes a Hall Effect sensor, wherein the encoder includes a magnet coupled to the first linkage, and wherein the measured position of the first linkage is based at least partially on the relative position between magnet and the Hall Effect sensor.

13. The electronic latch retraction device of claim 12, wherein the magnet is disposed in a sled, wherein the sled is constrained to move in a linear direction.

14. The electronic latch retraction device of claim 5, wherein a force applied to actuate the lever is between 1.2 and 2 times greater than a force applied to the first linkage.

15. The electronic latch retraction device of claim 5, wherein the electromechanical actuator includes a stepper motor.

16. An exit device comprising:

a push bar including a lever, wherein the lever is configured to move the push bar between an extended position and a retracted position;

a latch retraction device comprising:

a first actuator, a first linkage coupled to the first actuator, wherein the first linkage is configured to move in a linear direction between a first linear position and a second linear position, a cam wheel coupled to the first linkage with a first pin, wherein the cam wheel is configured to rotate about an axis of a second pin between a first rotational position and a second rotational position when the first linkage moves between the first linear position and the second linear position, and a second linkage coupled to the cam wheel with a third pin configured to move along a slot of the cam wheel, wherein the second linkage is configured to be coupled to the lever, wherein the second linkage is configured to actuate the lever when the cam wheel rotates from the first rotational position to the second rotational position, wherein the second linkage is configured to rotate and move in a linear direction as the cam wheel is rotated; and a dogging mechanism comprising:

a blocking element configured to move between a first blocking position and a second unblocking position, wherein the blocking element is configured to block motion of the push bar from the retracted position toward the extended position when the blocking element is in the second position, and wherein the blocking element is configured to allow motion of the push bar from the retracted position toward the extended position, a ratchet and pawl configured to prevent movement of the blocking element towards the second unblocking position, wherein the ratchet includes a plurality of locking regions, and a second actuator configured to move the blocking element from the first blocking position and the second unblocking position.

17. The exit device of claim 16, wherein the second actuator is a linear actuator configured to engage the pawl and the ratchet.

18. The exit device of claim 17, wherein the first actuator is configured to actuate the lever to move the blocking element to the first blocking position when the pawl and the ratchet are engaged to move the push bar to the retracted position.

19. The exit device of claim 18, wherein the linear actuator is further configured to disengage the pawl and the ratchet when the blocking element is in the first blocking position, wherein when the push bar is in a retracted position and the pawl and ratchet are disengaged, the push bar moves toward the extended position.

* * * * *